US010293560B2

(12) United States Patent
Chapman et al.

(10) Patent No.: US 10,293,560 B2
(45) Date of Patent: May 21, 2019

(54) TILED RETROREFLECTOR WITH MULTI-STAGE DICING

(71) Applicant: Avery Dennison Corporation, Glendale, CA (US)

(72) Inventors: Steven R. Chapman, Glenview, IL (US); Ethelbert Galicia, Lincolnwood, IL (US); Feng Wu, North Royalton, OH (US)

(73) Assignee: Avery Dennison Corporation, Glendale, CA (US)

( * ) Notice: Subject to any disclaimer, the term of this patent is extended or adjusted under 35 U.S.C. 154(b) by 300 days.

(21) Appl. No.: 14/944,655

(22) Filed: Nov. 18, 2015

(65) Prior Publication Data
US 2016/0144581 A1 May 26, 2016

Related U.S. Application Data

(60) Provisional application No. 62/082,179, filed on Nov. 20, 2014.

(51) Int. Cl.
*G02B 5/124* (2006.01)
*B29D 11/00* (2006.01)
*B29C 33/38* (2006.01)

(52) U.S. Cl.
CPC .... *B29D 11/00625* (2013.01); *B29C 33/3878* (2013.01); *B29D 11/00605* (2013.01); *G02B 5/124* (2013.01)

(58) Field of Classification Search
CPC .. G02B 5/122; G02B 5/124; B29D 11/00625; B29D 11/00605; B29C 33/3878
(Continued)

(56) References Cited

U.S. PATENT DOCUMENTS

| 4,202,600 A | 5/1980 | Burke et al. |
| 5,764,413 A | 6/1998 | Smith et al. |

(Continued)

FOREIGN PATENT DOCUMENTS

| EP | 2604773 | 6/2013 |
| JP | 9-256594 | 9/1997 |

(Continued)

OTHER PUBLICATIONS

Invitation to Pay Additional Fees dated Feb. 25, 2016 issued in corresponding International Application No. PCT/US2015/061278 filed Nov. 18, 2015.
(Continued)

*Primary Examiner* — Euncha P Cherry
(74) *Attorney, Agent, or Firm* — Avery Dennison Corporation

(57) ABSTRACT

Methods of making tiled articles and molds used to make retroreflective articles. The methods include forming a prism array on a master substrate and forming a replica of the master. A reference edge is formed on the replica, thereby reducing the size of the prism array, yet maintaining a lateral dimension of the replica to maintain ease of handling of the replica. The replica is copied and the reference edge on the copied tiles are exposed, such that the reference edge can be mated and secured face-to-face with a reference edge on other tiles in order to form a tiled article. The tiled article is used as a mold to produce retroreflective articles or can be further duplicated and mated to form larger tiled articles to be used as molds. Tiled articles used as molds and retroreflective articles produced from the molds are also disclosed.

12 Claims, 15 Drawing Sheets

(58) Field of Classification Search
USPC ........ 359/529–533, 546–553, 831, 833–834, 359/836
See application file for complete search history.

(56) References Cited

U.S. PATENT DOCUMENTS

| | | | |
|---|---|---|---|
| 5,898,523 | A | 4/1999 | Smith et al. |
| 6,413,615 | B2 * | 7/2002 | Smith .................... G02B 5/124 |
| | | | 359/529 |
| 2001/0032703 | A1 | 10/2001 | Paulson et al. |
| 2004/0174603 | A1 | 9/2004 | Smith |
| 2007/0171529 | A1 | 7/2007 | Chuang |
| 2009/0295755 | A1 | 12/2009 | Chapman et al. |
| 2011/0216411 | A1 | 9/2011 | Reed et al. |
| 2012/0050876 | A1 | 3/2012 | Sugiyama et al. |
| 2013/0255174 | A1 | 10/2013 | Stafford et al. |

FOREIGN PATENT DOCUMENTS

| | | |
|---|---|---|
| WO | 01/75247 | 10/2001 |
| WO | 2012/063759 | 5/2012 |
| WO | 2014/151368 | 9/2014 |

OTHER PUBLICATIONS

International Search Report and Written Opinion dated May 23, 2016 issued in corresponding International Application No. PCT/US2015/061278 filed Nov. 18, 2015.
International Preliminary Report on Patentability dated Jun. 1, 2017 issued in corresponding International Application No. PCT/US2015/061278 filed Nov. 18, 2015.

* cited by examiner

TILED RETROREFLECTOR WITH MULTI-STAGE DICING

CROSS-REFERENCE TO RELATED APPLICATION

The present application claims the benefit of U.S. Provisional Patent Application No. 62/082,179 filed Nov. 20, 2014, which is incorporated herein by reference in its entirety.

FIELD

The present subject matter relates generally, to methods of producing tiled articles used as molds for making retroreflective sheeting, more particularly, to methods of assembling tiled articles using multi-stage dicing techniques and sheeting produced thereby.

BACKGROUND

Retroreflective articles are well known for applications such as highway signs, safety reflectors, and road markers. Generally, cube corner versions of these articles have a frontal lens of transparent, colored or uncolored resin, such as methyl methacrylate, polycarbonate, or vinyl, with a smooth front surface and a plurality of retroreflective cube corner elements on the reverse surface. The cube corner elements each have three reflecting faces.

Incident light from a remote source passes through the smooth front surface, reflects off each of the three faces of a cube corner element, and passes back through the front surface in a direction nominally 180° to the direction of incidence. In a perfect retroreflector, this light is returned to the light source in a direction exactly opposite to the incoming direction of light. Partially because of variations in the structure of a retroreflector, either accidental or by design, the reflected light is not returned only in a direction exactly opposite to the incoming direction, but rather is returned typically into a spreading pattern, centered on the exact return direction. This "imperfect" return reflection is still termed "retroreflection". The spreading retroreflected light enables the retroreflector to be visible from directions slightly removed from the light source.

The angle between the incoming light source and the reflected light, and having a vertex at the retroreflector, is called the "divergence angle" and relates to the amount, in angular units, the retroreflected light diverges from perfect retroreflection. Conventional retroreflective articles are generally designed to be highly visible at long distances, corresponding to the "observation angle", which is the angle between the incoming light source and the observer, having a vertex at the retroreflector.

In highway safety applications, such as highway signs and pavement markers, the retroreflector should reflect light from a vehicle's headlights back to the eyes of the driver of the vehicle. This is imperfect retroreflection, in which the observation angle, $\alpha$, ranges between approximately 0° and more than 3°. The value of $\alpha$ in any given situation depends on the geometry of the vehicle and the driver and the distance from the vehicle to the retroreflective material. For example, the observation angle $\alpha$ for a large truck's right headlight and its driver at a distance of about 40 meters from a road sign will be approximately 3°, while the observation angle $\alpha$ for an automobile's left headlight and its driver at a distance of about 600 meters from a road sign should be approximately 0.05°.

Also associated with the observation angle, $\alpha$, is a rotation angle, $\varepsilon$, which is a measure of the direction of the divergence, also known as the azimuth angle. The value of $\varepsilon$ will be different for left and right headlights of a vehicle, and will also depend on the vehicle and driver geometry and the position of the road sign. For sheeting that will be mounted in random orientation on road signs, retroreflection is required at every value of $\varepsilon$. The angles $\alpha$ and $\varepsilon$ are defined in ASTM E808, Standard Practice for Describing Retroreflection, which document refers to divergence angle as "observation angle", $\alpha$.

Ideally, retroreflective sheeting used in road signs will produce a pattern of retroreflected light having sufficient intensity over a range of observation angle $\alpha$ values and rotation angle $\varepsilon$ values. However, various retroreflective articles are sensitive to the orientation of the article to the observer. That is, depending on the rotation angle $\varepsilon$, the observer will experience various intensities of retroreflected light. From one particular rotation angle $\varepsilon$, the retroreflection may be relatively intense, while at another rotation angle $\varepsilon$, the retroreflection may be relatively weak.

This sensitivity to orientation of an observer in relation to a retroreflective surface at various rotation angles $\varepsilon$, can be addressed in at least two ways. One way is to form a retroreflective article by using a mold made by "pinning," wherein a cluster of metal pins are assembled, each pin having a single cube corner machined and polished on one end. The pins would typically have a triangular, hexagonal, square, or rectangular cross-section. The pins could then be bundled together so that their machined tips could be used to form an array of "male" cube corners, and such a bundle would be used as a master to electroform a "female" mold. The mold would then be used to form an array of male prism elements in glass or plastic. It is well known that variations in the size or shape of the faces of the machined pin ends, or in the angles between the faces (dihedral angles), or in the flatness of the faces or the flatness of the front surface of the formed retroreflector, can all change the pattern of retroreflection and thereby determine the regions around the light source in which the retroreflection is visible.

Pinning allows for flexibility in the manufacture and design of cube corner arrays. Various shapes can be utilized, other than equilateral triangle cube corners, and each pin could be individually tailored in its geometry and orientation to contribute to the aggregate performance of the array.

However, because of manufacturing limitations, the pin typically has a geometric shape on the end of the pin that is about 0.040 inches (1 mm) square or larger (hereinafter called "macrocubes"). Hexagonal pins typically may have a dimension across parallel flats on the order of about 0.10 inch (2.5 mm). Rectangular pins have a short dimension of about 0.070 inch (1.8 mm) and a long dimension of about 0.120 inch (3.0 mm). Macrocubes, because of their height, are too large for use in the manufacture of thin flexible retroreflective sheeting requiring smaller retroreflective prism elements.

In order to make arrays of smaller prism elements (hereinafter, "microcubes"), a different technique has typically been used. In this technique, microcubes can first be formed in a master substrate. One method of forming the microcubes is by direct machining or ruling, wherein parallel rows of V-shaped grooves are cut into a substrate to create a pattern of grooves which intersect to form cube corner elements. Three such sets of V-shaped grooves can form an array of triangular-shaped cube corners. Arrays of such microcubes can be used as a mold for plastic retroreflective sheeting. The machining method often employs diamond cutting. By "diamond cutting" it is meant ultra precise direct mechanical machining of precision elements using a diamond cutting tool comprising a machining tool (e.g., lathes, turn-mills, rotary transfers, or non-rotary type free-form generation tools such as raster mills) and a diamond cutting element (such as a point, blade or edge) that scores, cuts, grinds, gouges, grooves, or otherwise modifies a surface by bringing the diamond cutting element into contact with the surface to be modified. The diamond cutting tools are used for engaging in on-axis or off-axis turning, ruling, flycutting, or micro-prismatic cutting operations and can produce sub-nanometer level surface finishes (peak to valley distance of the surfaces formed by diamond cutting) and sub-micron form accuracies. Diamond cutting machines often are computer numerical control (CNC) machine tools utilizing electric motors and piezoelectric actuators used for accuracy. The grooves produced by diamond cutting have smooth edges that are substantially free of burrs or other imperfections of micron size or greater that are associated with conventional cutting or machining techniques.

Another method of forming microcubes in a substrate involves forming rows of microcube corner prisms on the edge of thin plates or laminae. This technique, while being more difficult than direct machining methods, has the advantage of providing more freedom for different cube shapes and individual tailoring. These plates can be stacked together to form an array of prism elements.

A master of "male" or "female" cube corner elements can be used to make a sequence of replicas, copies or "tiles", of alternating gender (i.e. first generation and second generation), such as by electroforming. For example, if the master has protruding ("male") prism elements, then the first generation copies of the master will have recessed ("female") prism elements, i.e., the tiles will have opposite configuration from the master. The second generation copies will be substantially identical to the master, that is, the tiles will have protruding prism elements. At any stage, the first or second generation copies of the master can be diced or cut into a desired shape, and the diced tiles are then assembled together to form a tiled article. Assembling tiles together into a larger assembly is herein known as "tiling" and larger assembled arrays are known herein as "tiled articles," wherein several tiles having smaller arrays of prism elements are joined into a larger tiled article. In turn, the tiled articles can also be copied to form a larger tile, and then joined together to make further, even larger, tiled articles. When referring to a "tile", it is meant a unitary or single-piece structure or substrate. When referring to a "tiled article", it is meant a multi-piece structure, formed by joining two or more tiles or substrates together. When referring to "master", it is meant any structure that is used to form replicas. That is, a master can be a single-piece substrate or a tiled article. In either event, the replica of the master or a diced portion of said replica can be considered to be a tile, i.e. a unitary, single-piece structure. For example, if either a single-piece structure or a multi-piece structure (i.e. a tiled article) is duplicated such as by electroforming, the replica or a diced portion thereof can be considered to be a tile (i.e. single-piece structure) because electroforming will produce a replica having a unitary, single-piece structure without seams.

After a series of copying and tiling stages, a single "mold" can be formed. The "mold" can be used to make production tools, such as by electroforming, which tools can be used to form microcube or other retroreflective elements on an expanse of plastic sheeting material such as by embossing, casting, compression molding or other methods known in the art. Alternatively, the mold itself can be used to make a retroreflective article.

In either the direct machining or laminae methods of forming micro prism elements, such prism element arrays will typically only have one or two prism orientations present, and thus a high sensitivity to orientation. So it is desirable for copies of such assemblies to be diced as described above to form tiles. Orientation sensitivity is addressed by alternating the orientation of the individual tiles in the tiled article. In particular, prism orientations of the individual tiles are varied between adjacent tiles. This alternating or varied prism orientation between individual adjacent tiles produces a retroreflective article that is less sensitive to the rotation angle $\varepsilon$, than would an article having only a single prism orientation. This is done to provide larger aggregate cube corner arrays with reduced sensitivity to orientation. Further, the size of the tiles can be reduced to make the visual contrast between differently oriented tiles less noticeable, i.e. less resolvable to the human eye.

However, this tiling technique has at least two limitations, among many. The process of tiling arrays of microcubes encounters similar limitations to those seen in the pinning of macrocubes and some others limitations. First, very small tiles are difficult to physically handle or maneuver. This difficulty is a deterrent to making smaller sizes of individual prism arrays in a tiled article. The smaller the tile, the more difficult it becomes to handle and position. This adds to production cost and time for the tiled molds. Second, typical dicing processes used to make tiles of various shapes and sizes, produce crude edges of degraded performance on the tiles. That is, conventional dicing produces tiles that can have an edge with partial and/or damaged prism elements and tiles with edges that are not sufficiently straight. As the tile size is reduced, the proportion increases between that of the degraded edge portion and the rest of the prism array, thus reducing the fill factor for retroreflective articles made with such tiled molds. Further, if the tiles are not accurately sized or shaped and have crude edges, an assembly of such tiles edge-to-edge may have small gaps between the tiles, i.e. wide seams between tiles, which can create problems during replication and similarly degrade the retroreflective fill factor of the articles produced from such molds.

SUMMARY

The embodiments of the present subject matter described below are not intended to be exhaustive or to limit the subject matter to the precise forms disclosed in the following detailed description. Rather, the embodiments are chosen and described so that others skilled in the art may appreciate and understand the principles and practices of the present subject matter.

The present subject matter is directed to methods of making tiled articles used as molds in forming retroreflective articles. The methods address the problems associated with conventional tiling techniques, wherein relatively small tiles are difficult to handle and wherein crude edges are commonly formed on tiles during dicing, resulting in large or wide seams between tiles. The methods provided herein allow for the formation of precise edges on the tiles, which are mated to provide thin seams between tiles in a tiled article. The methods also address the deterrent to handling smaller prism arrays on the tiles by forming smaller prism arrays on each tile, while at the same time allowing the tiles to maintain a relatively large lateral dimension after dicing to allow for easy handling of the tiles. This larger lateral dimension and smaller prism array combination may be formed in the master, and maintained in the replicas of the master, or may be formed in the replicas themselves. In either event, the replica tiles can be easily modified and then mated with one another in order to form a tiled article having relatively smaller prism arrays thereon than conventionally constructed tiles with thin seams between the tiles.

In one exemplary embodiment of the presently described subject matter a method of making an article includes forming prism elements on a surface of a substrate. The method also includes forming a wall on the substrate, wherein the wall shares a first common edge with the surface. The method further includes forming a face on the substrate, wherein the wall shares a second common edge with the face and the first common edge is on an opposite side of the wall from the second common edge.

In another exemplary embodiment of the presently described subject matter, a method of making a tiled article includes providing a tile including a top surface comprising prism elements. The method also includes forming a wall on the tile by removing a portion of the top surface of the tile, wherein the wall shares a first common edge with the top surface of the tile. The method includes forming replicas of the tile; and positioning the replicas such that a wall on each replica is face-to-face with, and directly abuts a wall on an adjacent replica to thereby form a tiled article.

In another exemplary embodiment of the presently described subject matter, a method of making a tiled article includes forming prism elements on a surface of a substrate. The method includes forming a reference edge on the substrate, such that the reference edge extends into the substrate at about 90° to the surface having the prism elements. The method includes forming replicas of the substrate, and removing a portion of each replica such that a reference edge on each replica is able to abut face-to-face with a reference edge on a different replica. The method includes abutting face-to-face the reference edge on each replica to a reference edge on another replica, and securing the replicas together to thereby form a tiled article.

In a further exemplary embodiment of the presently described subject matter, a tiled article comprises tiles positioned together in a two dimensional pattern. Each tile comprises a top surface including an array of prism elements, and side surfaces. The tiles comprise edge tiles and optionally interior tiles. Each side surface of each interior tile includes a wall and a face. At least one side surface of each edge tile includes a wall and a face. Each wall of each interior tile is abutting face-to-face with a wall of an adjacent tile and each face on each interior tile does not abut face-to-face with a face of an adjacent tile. Each wall of each edge tile is abutting face-to-face with a wall of an adjacent tile and each face on each edge tile does not abut face-to-face with a face of an adjacent tile.

In a further exemplary embodiment of the presently described subject matter, a method of making a tiled article comprises providing a substrate having prism elements in a surface thereof. The method also includes creating replicas of the substrate, each replica having at least one reference edge therein. The method additionally includes creating a rough cut through each reference edge in each replica. The method includes tiling the replicas such that reference edges in the replicas abut face-to-face and rough cuts in the replicas do not abut face-to-face, to thereby produce the tiled article.

In a further exemplary embodiment of the presently described subject matter, a method of forming a retroreflective article comprises:

a) forming prism elements on a surface of a master;
b) creating a replica of the master;
c) creating at least one reference edge on the replica
d) creating copies of the replica;
e) positioning the copies relative to each other such that reference edges on each copy abut face-to-face;
f) optionally repeating any one or more of b) to d), wherein the master comprises the product of any one or more of a) to d); and
g) molding a retroreflective article using a mold produced by at least one of a) to d), or a) to e);
wherein a) to f) are performed in sequence or out of sequence.

In a further exemplary embodiment of the presently described subject matter, a method of making an article comprises forming an array of prism elements on a surface of a substrate, and forming a plurality of walls on the substrate to thereby form the article. Each of the plurality of walls shares a first common edge with the surface.

In a further exemplary embodiment of the presently described subject matter, a method of making a mold used for forming retroreflective articles comprises providing a plurality of tiles, each tile having prism elements on a surface thereof, one or more reference edges, and a lip. The method includes making one or more rough cuts in each of a plurality of tiles to thereby remove the lip on each of the plurality of tiles and to thereby expose one or more reference edges on each of the plurality of tiles, such that each of the one or more exposed reference edges on each of the plurality of tiles are able to abut face-to-face with one or more exposed reference edges on other tiles of the plurality of tiles and rough cuts on each of the plurality of tiles do not abut rough cuts on other tiles of the plurality of tiles. The method also includes mating the plurality of tiles such that the one or more exposed reference edges on each of the plurality of tiles abut face-to-face.

In a further exemplary embodiment of the presently described subject matter, a substrate for use in making retroreflective articles includes a surface comprising an array of prism elements. The substrate includes one or more depressions, each of the one or more depressions being at least partially defined by a reference edge. The substrate also includes a base portion comprising a lip, the lip defining a periphery of the base portion.

Conventional retroreflective mold manufacturing methods and designs include structural and optical limitations which are addressed by use of the molds, tiles, tiled articles, and methods described herein. Use of this subject matter permits expanded mold shaping parameters. For example, smaller prism arrays or prism array clusters may be readily manufactured using conventional tile handling techniques that do not require time and money consuming precision. Further, the methods and articles described herein provide precise, thin seams between tiles in a tiled article. The smaller seams between tiles in a tiled article produce more efficient retroreflective articles.

Multiple structure manufacturing techniques may also produce enhanced optical performance resulting from closely spaced intermixed prism elements or clusters with different prism shapes, sizes, and orientations. Further, the size of the prism arrays on the tiles can be made smaller, while maintaining the ease in which larger tiles are handled, moved, or otherwise manipulated. These advantages present more uniform appearances of multiple structure arrays in a retroreflective article produced with the molds of the present subject matter over a wide range of viewing distances and observation and rotation angles. Multiple structure arrays may also be based on more than one type of matched pair of cube corner elements. The present subject matter applies to all prism arrays, regardless of how they originated.

Other features and advantages of the present subject matter will become apparent to those skilled in the art from the following detailed description. It is to be understood, however, that the detailed description of the various embodiments and specific examples, while indicating various embodiments of the present subject matter, are given by way of illustration and not limitation. Many changes and modifications within the scope of the present subject matter may be made without departing from the spirit thereof, and the subject matter includes all such modifications.

BRIEF DESCRIPTION OF THE DRAWINGS

These, as well as other objects and advantages of this subject matter, will be more completely understood and appreciated by referring to the following more detailed description of the present exemplary embodiments of the subject matter in conjunction with the accompanying drawings, of which.

Figure 1:
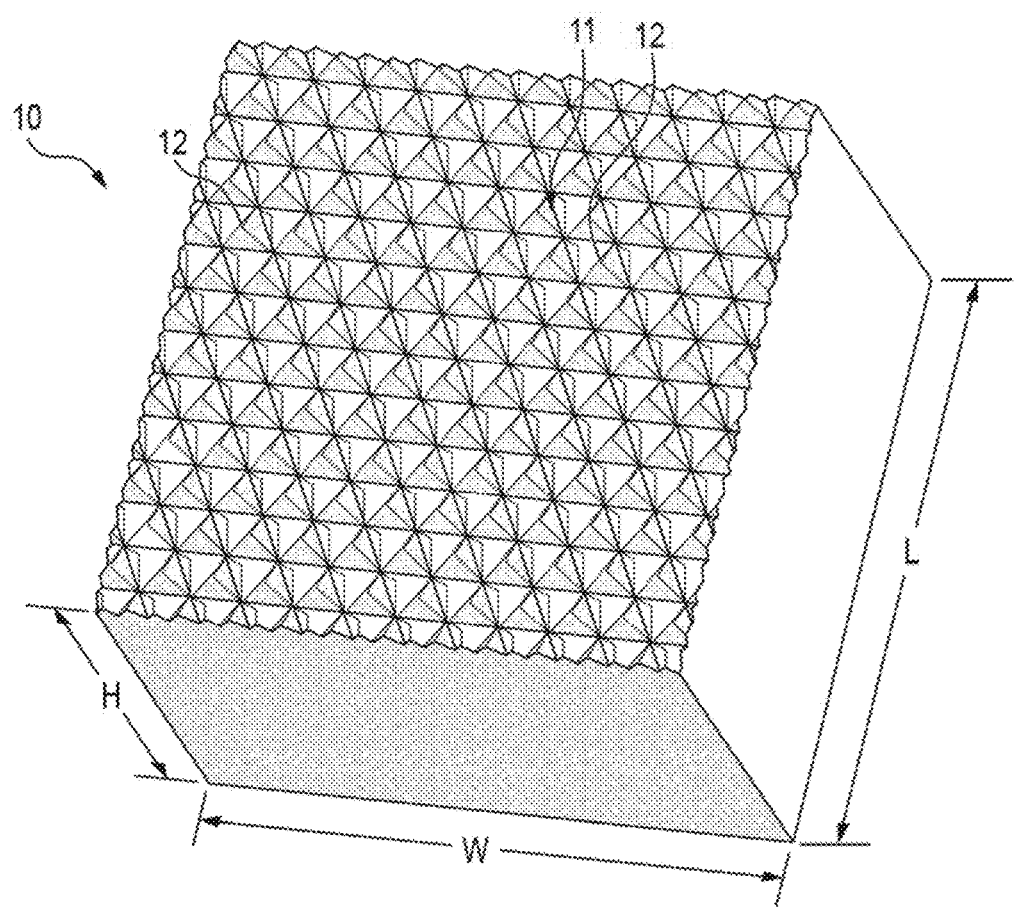
FIG. 1 is a perspective illustration of a substrate according to the present subject matter.

Unless otherwise indicated, the illustrations in the above figures are not necessarily drawn to scale.

DETAILED DESCRIPTION OF THE EMBODIMENTS

The apparatuses and methods in accordance with the present subject matter are described in detail by way of examples and with reference to the figures. Unless otherwise specified, like numbers in the figures indicate references to the same, similar, or corresponding elements throughout the figures. It will be appreciated that modifications to disclosed and described examples, arrangements, configurations, components, elements, apparatuses, methods, materials, etc. can be made and may be desired for a specific application. In this disclosure, any identification of specific shapes, materials, techniques, arrangements, etc. are either related to a specific example presented or are merely a general description of such a shape, material, technique, arrangement, etc. Identifications of specific details or examples are not intended to be, and should not be, construed as mandatory or limiting unless specifically designated as such.

A "prism element" as used herein, means a three-dimensional geometric shape on a surface of a substrate. Prism elements are shapes used to form retroreflective elements on a surface of a material in order to make a retroreflective article. Prism elements include prism clusters.

A "prism cluster" as used herein, means a grouping of portions of contiguous prism elements.

An "array", "arrangement" of prism elements or a "prism array/arrangement" as used herein mean a collection of two or more prism elements or prism clusters, including microcubes and other prism elements. Those skilled in the art will recognize that a retroreflective article having desired performance characteristics could be made from a composite of different arrays.

The term "cube corner elements" as used herein includes those elements consisting of three mutually intersecting faces, the dihedral angles of which are generally on the order of 90°, but not necessarily exactly 90°.

In accordance with the present subject matter, methods are disclosed for making a substrate used in a process of forming retroreflective articles. The substrate itself may be used as a mold to form retroreflective articles, or may be used as a master to form replicas by a replication technique such as electroforming. The replicas have prism element recesses and/or protrusions thereon. A plurality of replicas may be formed from the master and modified and assembled edge to edge for creating a mold used in forming retroreflective articles that are larger than the master.

In reference to the figures, the substrate 10 comprises a surface 11 including prism elements 12 formed thereon. The substrate may be used as a master and can be formed by ruling prism elements into a surface of the substrate 10 using diamond cutting. The substrate, or replicas thereof, can be formed or cut to a desired size, such that a plurality of replicas may be arranged to form a tiled article with zones of prism arrays of differing orientation, which is desired in retroreflective sheeting. Thus, for example, the master or replicas can be cut to form zones of prism arrays having shapes such as squares, rectangles, triangles, hexagons, or the like.

The replicas are then arranged in a pattern that will produce a tiled article having the desired zones of differing prism orientation. The tiled article can be used as a mold to form a retroreflective article having zones of prism arrays with different prism orientation.

The substrate 10 depicted in FIG. 1 may be duplicated to form replica tiles. In one embodiment, walls 13, also referred to herein as "reference edges", are formed in the replicas or in the master by diamond cutting. Reference edges 13 as shown in FIGS. 2-5 may be formed in the replicas, or may alternatively be formed in the master before replication as desired. That is, the master may or may not have reference edges 13 formed therein before duplication. Accordingly, replicas of the master may be formed without reference edges 13, as shown in FIGS. 1, and 18-20. Alternatively, the master may have reference edges 13 formed therein before duplication, as shown in any one of FIGS. 2-5, and 21, and thus the duplicates of the master will also have the same reference edges 13. In one embodiment, the walls 13 are made by forming depressions 15 in the substrate. One or more faces 17 are formed in the replica tiles, which are then joined together at their walls 13, in a wall-to-wall abutting orientation, to form a tiled article 28. This wall-to-wall orientation between two tiles is also referred to herein as the walls being "face-to-face" and as the tiles or walls being "mated" or "mating". The tiled article 28 itself can be used to make a mold for forming a retroreflective article, or can be used itself as the mold. Alternatively, the tiled article may be replicated to form even larger tiles, wherein the larger tiles are joined together at their reference edges to form an even larger tiled article, which can also be used as a mold for forming retroreflective articles. When a tiled article is repeatedly duplicated, and the duplicates are joined at a reference edge, a tool is formed comprising a plurality of tiles joined together at their reference edges. The tool may be then used as a mold to make retroreflective articles.

Substrate

The substrate 10 that is used to form the master or tiles is not particularly limited and can comprise any material having a surface capable of having prism elements formed thereon. The material can be for example, nickel, copper, aluminum, brass, or a combination thereof. Other materials can be used and the present subject matter is not limited to these metals. For example, polymers such as acrylics and polyurethanes can also be used as the substrate material.

Further, the shape of the substrate 10 is not particularly limited and can comprise any shape capable of having prism elements formed on a surface thereof. Although depicted in the figures as being various cuboid shapes having a square flat surface 11 on which prism elements 12 are formed, the substrate 10 is not limited to such shapes having a square flat surface 11. Rather the substrate can comprise other shapes and can have an undulating surface on which prism elements are formed.

In one embodiment, the substrate used as a master or tiles is a cuboid having height, width and depth dimensions and having generally flat smooth surfaces, as shown in FIG. 1. In one aspect, the height H of the substrate ranges from 250 microns to about 50 millimeters. Width W and length L dimensions of the substrate range from about 1 millimeter to 250 millimeters.

Many shapes of substrates, besides a cuboid having flat planar surfaces, can be utilized in the methods disclosed herein including a cuboid with curved planar surfaces.

Prism Elements

In one embodiment in accordance with the present subject matter, the methods include forming prism elements 12 on the surface 11 of the substrate 10. In another embodiment, the methods include only providing a substrate having prism elements thereon. The form, shape, or arrangement of the prism elements on the surface of the substrate is not particularly limited and can comprise for example, cube corner elements, prism clusters, or the like arranged in an ordered array or randomly. The prism elements or clusters can be closely packed together or spaced apart. The prism elements can include single, portions of, ordered or random series of, or clusters of triangular, square, rectangle or other polygonal cube corner prism elements, or a combination thereof. The size of the prism elements, including height dimensions (projecting perpendicular to the surface 11) and lateral dimensions (projecting parallel with the surface 11, including width and length) is not particularly limited. In one embodiment, the prism elements on the master have a height dimension ranging from about 20 microns to about 250 microns. The prism elements can be canted or uncanted.

Prism elements on individual tiles can be the same or different between the individual tiles in a tiled article and can be the same or different on the same tile. Two or more prism elements or prism clusters are collectively known as a prism array. Such prism arrays on the tiles can be the same or different from one tile to another in a tiled article. That is, the tiles in a tiled article can have all the same, all different, alternating, or various patterns of prism elements between the tiles.

In one embodiment, the prism elements are formed by diamond cutting the prism elements into the surface 11 of the substrate 10 to form a prism array on the substrate. Other prism element formation techniques can be used. In one embodiment, the formation of the prism elements or clusters on the surface of the substrate includes further modification, such as removal of some of, or a portion of, the prism elements from the surface 11 or from the substrate 10.

In one embodiment, the prism array on the substrate comprises prism elements having a prism orientation. As will be discussed further herein, the prism orientation can be varied between tiles in a tiled article. In one aspect of this embodiment, the prism array comprises closely packed triangular cube corner prism elements having a prism orientation.

Reference Edge

Figure 2:
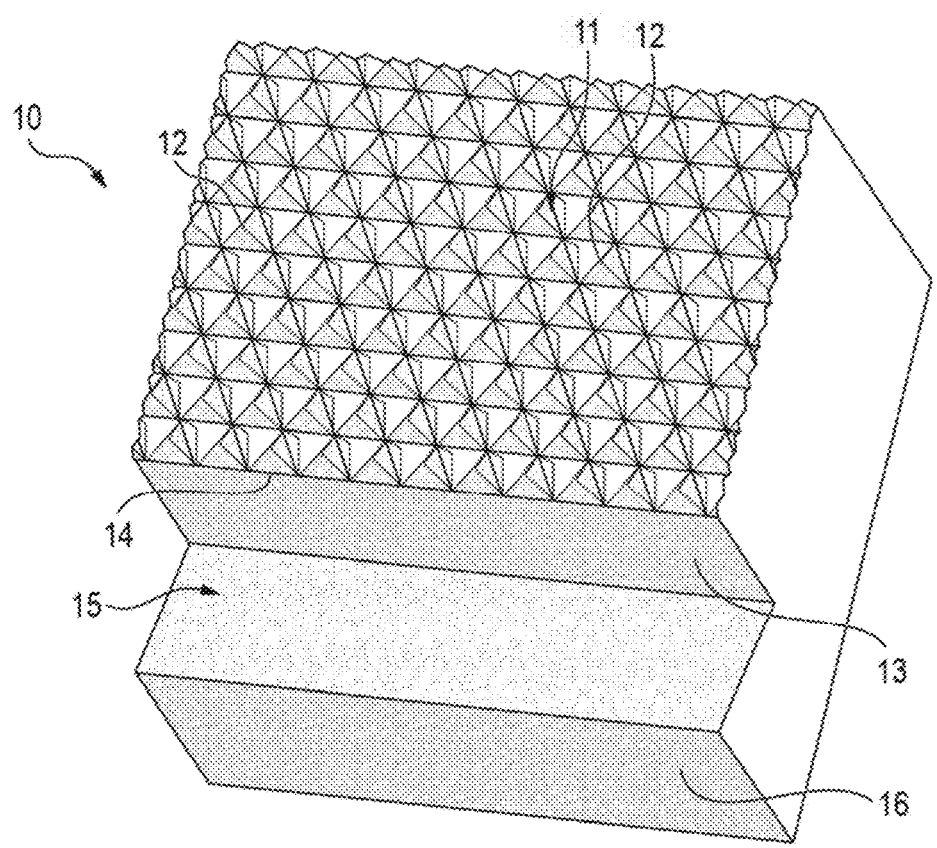
FIG. 2 is a perspective illustration of the substrate of FIG. 1, further modified according to the present subject matter.
Figure 3:
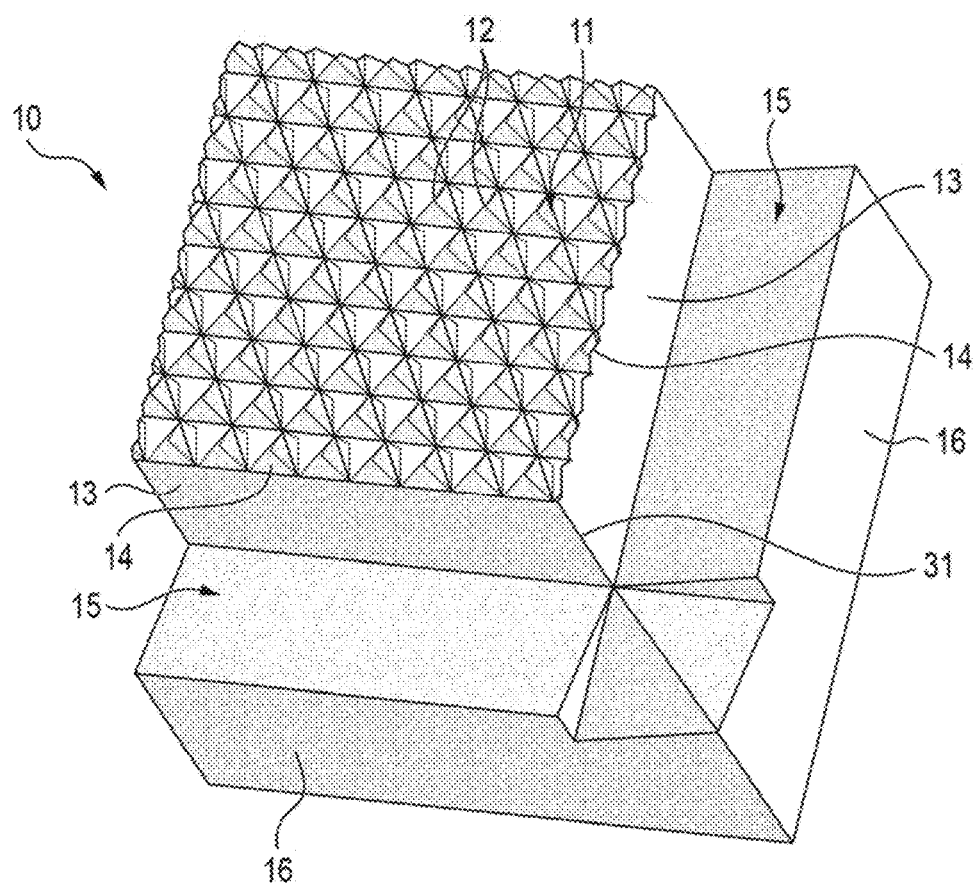
FIG. 3 is a perspective illustration of the substrate of FIG. 2, further modified according to the present subject matter.
Figure 4:
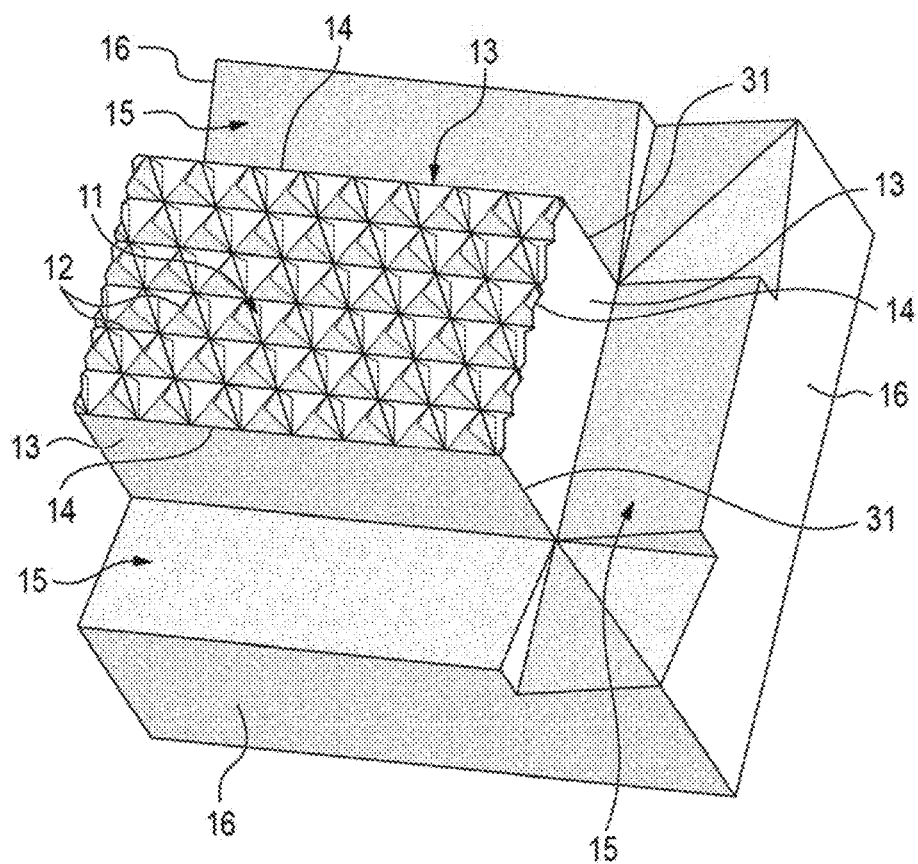
FIG. 4 is a perspective illustration of the substrate of FIG. 3, further modified according to the present subject matter.

In one embodiment in accordance with the present subject matter, the methods include forming a precise reference edge, also referred to herein as a "wall" 13 as shown in FIG. 2, on a replica tile or on the master. When referring to "wall" herein, it is meant a precise reference edge 13 as described herein, formed by diamond cutting or other precise forming techniques. Forming the reference edge or wall, may reduce the size of the prism array on the surface 11 of the substrate 10 and/or may reduce a lateral size of the substrate as measured through a top surface. In another embodiment, two or more walls may be formed in the substrate as shown in FIGS. 3-15, 17, and 21.

Figure 21:
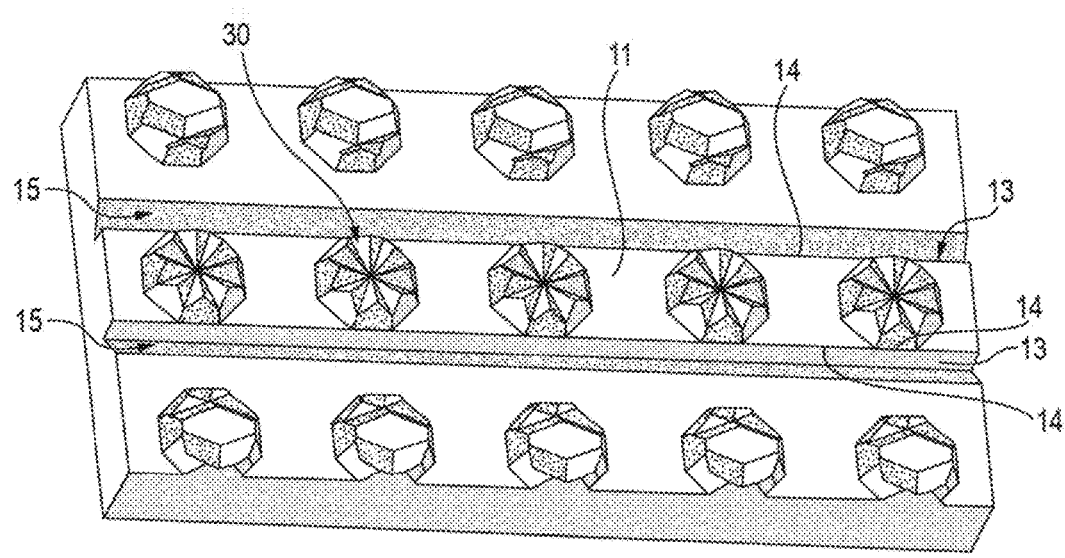
FIG. 21 is a perspective illustration of the substrate, or replica thereof, of FIG. 20, further modified according to the present subject matter.

In one embodiment, the walls 13 share a first common edge 14 with the surface 11 on which the prism elements 12 are formed such as that depicted in FIG. 21 for example. In another aspect, the walls 13 share a first common edge 14 with the prism array itself, as shown in FIGS. 2-7 and 10-11 for example. In this aspect, the prism array is bounded on at least one side by an edge of a wall 13. That is, one edge of a wall defines a bounded side of the prism array as shown. The wall can extend entirely through the substrate, or can extend partially into the substrate as shown in FIGS. 2-5, 10, 13, and 21 for example.

In reference to FIGS. 1-5, 10, 13, and 21 there is shown substrate 10 having a surface 11 comprising prism elements 12 (FIGS. 1-5, 10, and 13) or prism clusters 30 (FIG. 21). The walls 13 are formed in the substrate 10 by making depressions 15 in the substrate. The depression can be formed by cutting, gouging, vaporizing, or by other known means. In one aspect the depressions and walls are formed by diamond cutting. The depressions 15 are at least partially defined by one wall 13 and in one embodiment, both the depressions and the wall do not extend all the way through the height of the substrate as depicted in the figures. In one aspect, the depressions extend all the way through a lateral dimension of the substrate, from one side surface of the substrate to an opposite side surface of the substrate as shown in FIGS. 2-5, 10, 13, and 21 for example. In one aspect, formation of multiple depressions and walls shortens a width of the walls, as shown in FIGS. 2-5, where the first wall made is shortened in a width dimension when subsequent walls are made. This process also reduces a size of the prism array on surface 11 that will be used to form a tiled article having the smaller prism arrays thereon.

The walls 13 share a common edge 14 with the surface 11. The common edges 14 collectively define the boundary of the prism array. In one aspect the walls 13 share a common edge 14 not only with the surface 11, but also with the prism elements 12 as depicted in FIG. 21.

Figure 8:
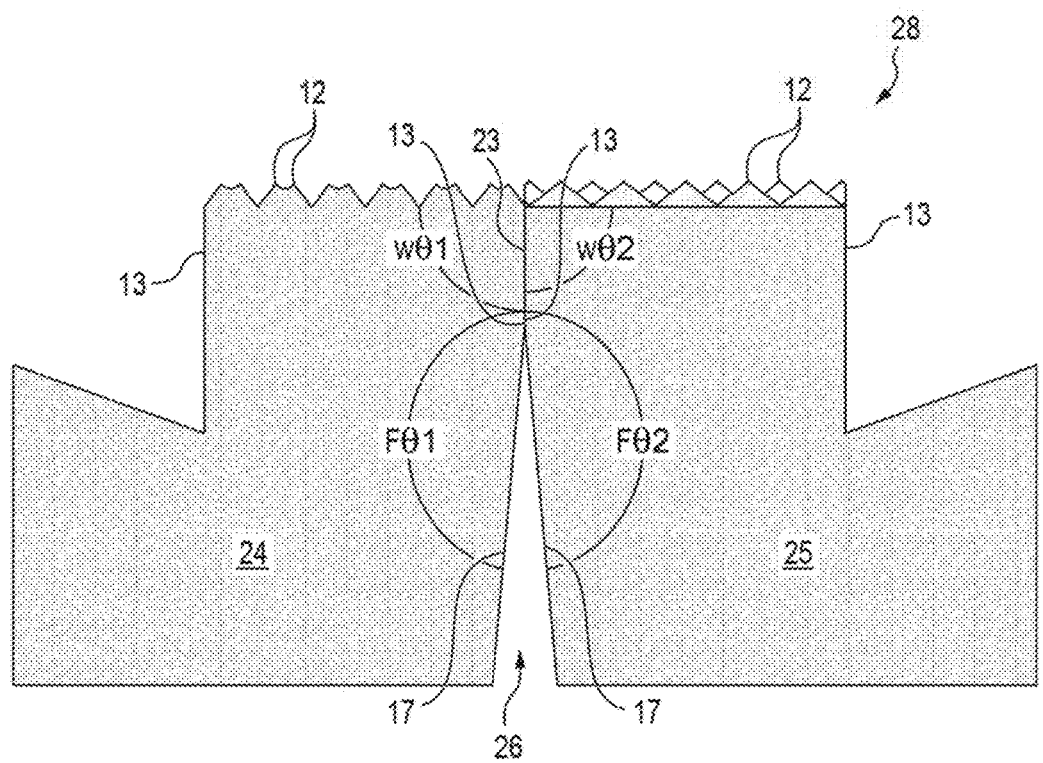
FIG. 8 is a sectional illustration of a tiled article according to the present subject matter.

The wall 13, because it shares the first common edge 14 with the surface 11 on which the prism elements are formed, thereby forms an angle to the surface as measured through the substrate. This angle, herein referred to as the "wall angle", shown in FIG. 6 as W$\theta$, is not particularly limited and can range up to just less than 180°. If the wall is formed in a master, a replica of the master will have a wall with the same wall angle. As shown in FIG. 8, this first tile 24 is mated to a second different tile 25 having a wall that can mate with the wall of the first tile 24. In other words, the first tile will have a wall with a first wall angle W$\theta 1$ and the second tile will have a wall with a second wall angle W$\theta 2$. The first wall angle W$\theta 1$ and the second wall angle W$\theta 2$ are supplementary angles, i.e. the wall angles of the mating walls add up to about 180°. For example, where the first wall angle W$\theta 1$ is about 70°, then the second wall angle W$\theta 2$ will be about 110°.

In one embodiment, the wall angle W$\theta$ on the substrate is about 90° as shown in the figures. Therefore, mating tiles will each have walls with a similar wall angle W$\theta$ of about 90°. Accordingly, walls with different wall angles, i.e. other than 90°, will not have to be formed. Where the first wall angle and the second wall angle are supplementary on the tiles, then when mated, the surfaces 11 of the first and second tile will lie in the same plane as shown in FIGS. 8, 9, 12, 16, 17, 22, 23 and 24.

In another embodiment, the supplementary relationship between the wall angles of mated tiles can be varied, such as when the surfaces 11 of the mated tiles are to be angled in relation to each other, rather than being in the same plane. In this embodiment, the wall angles between mating walls 13 can add up to be greater than 180° or less than 180°.

In one embodiment, the wall 13 formed in the substrate 10 has a height that is greater than a height of the prism elements 12. In one embodiment, the walls have a height ranging from about 25 microns to about 1 millimeter. In other embodiments, the wall has a height that is not greater than a height of the prism elements.

In one embodiment, the wall is formed by diamond cutting. Diamond cutting creates a wall having a precision surface. In other words, diamond cutting produces a wall having a particularly smooth and flat surface. This smooth and flat surface defining the wall will enable tiles to be mated wall-to-wall, in order to create a precision seam between tiles, as will be discussed in greater detail herein. Precision seams between tiles allow for greater retroreflective fill factors for retroreflective articles made from the molds provided herein, as less light is scattered at the seams than in conventional crude seaming techniques. Depicted as a flat planar surface, the wall is not limited to such, but can be a curved planar surface, a surface that is not planar, or a surface that is multi-planar. Whatever the shape or form of the wall, a mating wall may have a corresponding shape to be able to form a precision seam.

Figure 5:
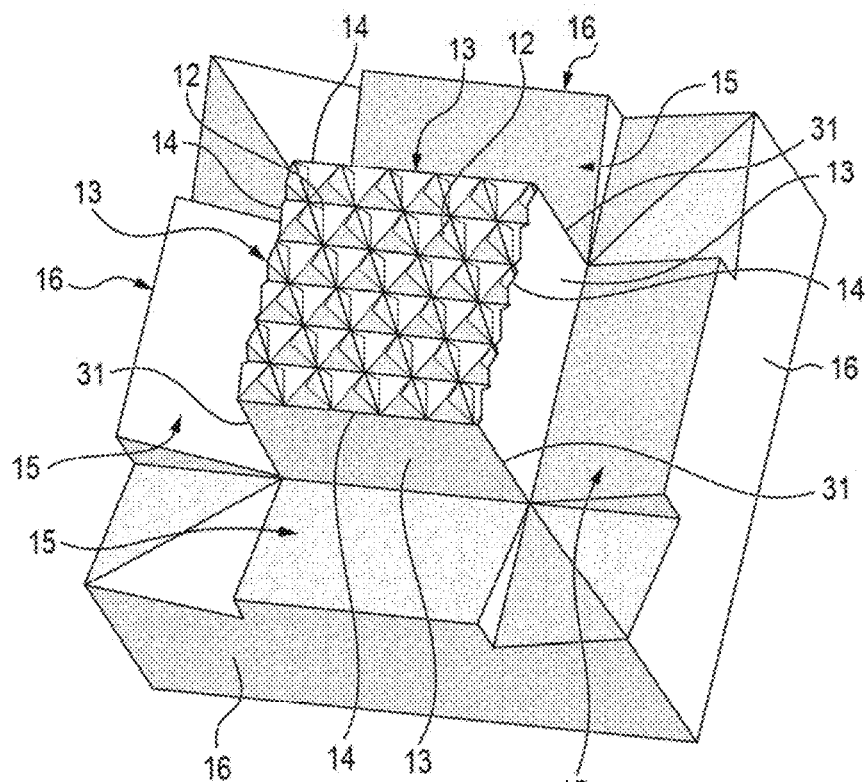
FIG. 5 is a perspective illustration of the substrate of FIG. 4, further modified according to the present subject matter.
Figure 10:
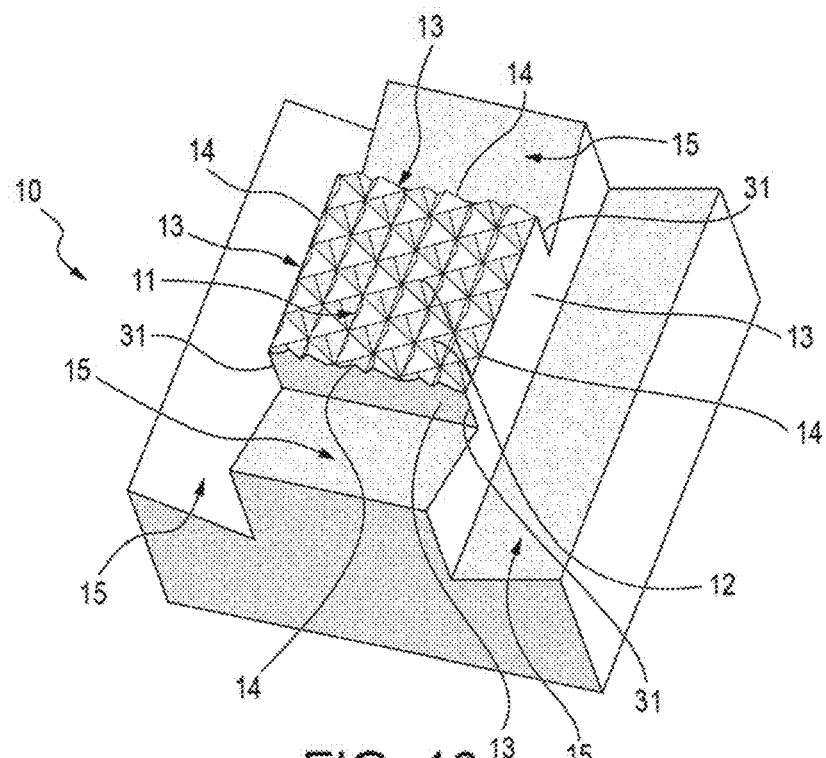
FIG. 10 is a perspective illustration of a substrate, according to the present subject matter.

In one embodiment, a plurality of walls is formed in the substrate. In one aspect of this embodiment, the plurality of walls collectively forms a boundary around the prism array, the boundary being defined by the first common edges 14 as shown in FIG. 5. In another aspect of this embodiment, each of the plurality of walls also shares a common interface 31 with an adjacent wall as indicated in FIGS. 3-5, 10, and 14. In another aspect of this embodiment, the walls 13 have heights that are different as depicted in FIGS. 10-15 and 17 for example wherein a wall 13 on one side of the substrate 10 has a height different from contiguous walls on adjacent sides of the substrate 10. In other words, the depressions 15 forming the walls 13 extend into the substrate 10 to different depths. The heights of the walls forming the boundary around the prism elements 12 can alternate between a greater height and a lesser height going around the prism elements 12 as shown in FIGS. 10 and 13 for example. Varying the heights of adjacent walls ensures that during replication of a tiled article having two or more mated tiles, that the space 26 (see FIG. 8 for example) between tiles does not create difficulties in the replication.

In one embodiment, in making the depressions 15 to form the walls 13, some of the prism elements 12 on the surface 11 are removed as shown in FIGS. 2-5. However, in another embodiment, forming the walls 13 on the substrate 10 does not remove any of the prism elements as shown in FIG. 21.

In one embodiment, forming the depressions and walls does not reduce any lateral dimension, i.e., length or width, of the substrate, as shown in FIGS. 13 and 21. In another embodiment, forming the depressions and walls does not substantially reduce a lateral dimension of the substrate 10 but may reduce the area of the surface 11 in either or both of the length dimension and width dimension, as shown in FIGS. 2-5. Forming depression 15 in the substrate also results in the removal of only a top peripheral portion of the substrate as shown between FIG. 1 and FIGS. 2-5. Removing the top peripheral portion of the substrate 10 may create a lip 16 on a bottom or lower portion of the substrate. When forming multiple depressions 15 and walls 13 all the way around the substrate 10, a top peripheral portion of the substrate is removed, but a base portion remains intact, thereby forming the lip 16 around the entire base of the substrate 10. The substrate 10 therefore has a lateral dimension, measured through the base portion (including the lip 16) from one side surface to an opposite side surface and parallel to the surface 11, that is not diminished when forming the depressions 15 and walls 13. The lateral dimension of the substrate 10, as measured through the base portion, remains the original size. Only a lateral dimension measured through the top portion of the substrate 10 from one wall 13 to another wall 13 and parallel to the surface 11, is reduced in size when forming the depressions 15 and walls 13.

The formation of a tile in these ways allows for smaller prism arrays on surface 11 while allowing for the handling of tiles having larger lateral dimensions. This is accomplished by retaining a relatively larger lateral dimension measured through the base portion of the substrate, while creating relatively smaller prism arrays on the surface 11 the substrate. This modification of the substrate minimizes the lateral size of the prism array on surface 11, while maintaining the larger lateral dimension on the bottom portions of the substrate. When moving, adjusting, manipulating, and otherwise configuring the substrate, the larger lateral dimension through the base portion allows for the use of less precise handling techniques than would ordinarily be required for such a small prism array, such as that measured through the upper portion of the substrate. At the same time, it is possible to include a smaller array than would otherwise be feasible with less precise handling techniques, because a larger lateral dimension of the substrate is maintained. It is by having a larger lateral dimension retained in the tiles that handling of the tiles is thereby made easier, while also providing smaller prism arrays included in the tiled article.

Figure 7:
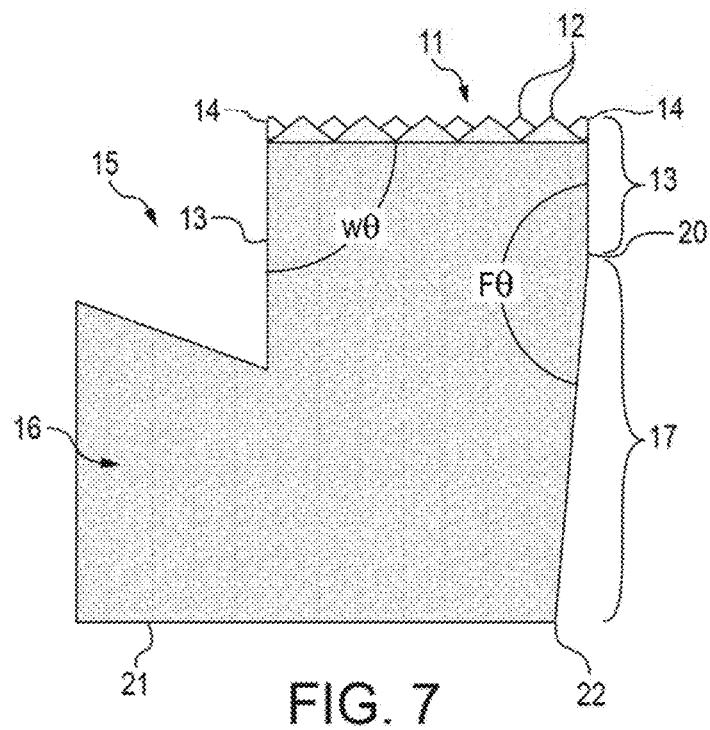
FIG. 7 is a sectional illustration of the substrate, or replica thereof, of FIG. 6, further modified according to the present subject matter.
Figure 22:
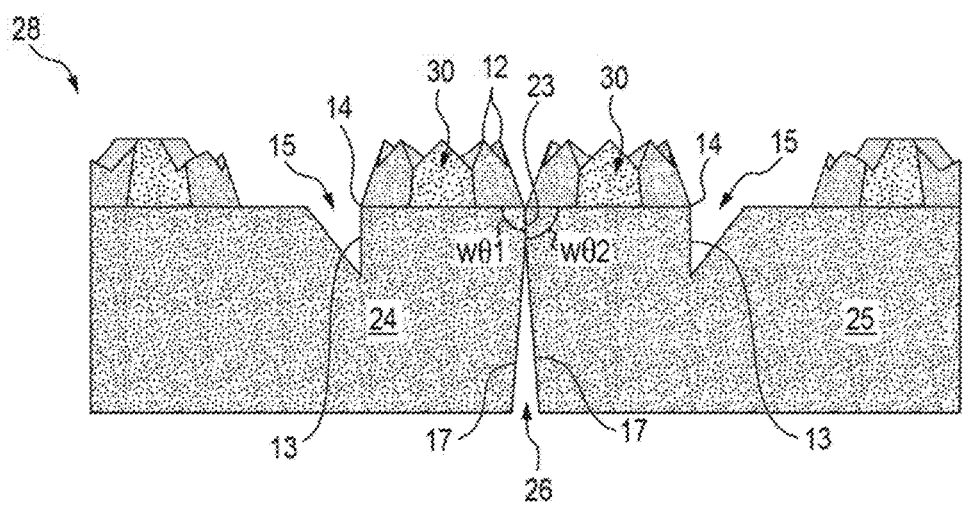
FIG. 22 is a sectional illustration of a tiled article, the tiled article including two replicas of the substrate of FIG. 21, the two replicas having been further modified according to the present subject matter.

This larger lateral dimension, as measured through the base portion in the replicas, is only reduced when the lip 16 in completely removed as depicted in FIGS. 7 (lip removed from right hand side of substrate), 11, 14, and 15, or when a face 17 is created as shown between FIGS. 21 and 22.

Replication

The substrate having prism elements 12 may be used as a master for creating replica tiles. Replication can be performed on the master, wherein the master may optionally include a reference edge. Where the master includes a reference edge 13, replicas of the master also include the reference edge 13. After modifying the replica tiles by forming a face 17, the tiles may be joined together along their reference edges 13 to form a tiled article 28. In another embodiment, the master does not include a reference edge 13. In this embodiment, a replica of the master is formed, and one or more reference edges 13 are formed in the replica. Thereafter, copies of the replica are formed by replication. The copies can then be modified by creating a face 17 and joined together to form a tiled article. By "copy" or "copies", it is meant a duplicated replica. In other words, a second or later generation duplicate of the master, i.e. a replica of a replica of the master. The tiled article 28 itself can be further used as a master and replicated to form a larger tile, and then joined with other tiles or tiled articles to form an even larger tiled article. Replication of the master, of a replica of the master, or of a tiled article 28 used as a master, can be accomplished through any process as long as a sufficient level of precision is maintained on the replicas for the prism elements 12, and for the walls 13 if present before duplication. Whether formed before or after duplication, precise walls in the tiles may produce a tiled article having seams 23 that are smooth and close fitting. Examples of precise seams 23 are shown in FIGS. 8, 9, 12, 16, and 22-24. When a tiled article having smooth and close fitting seams 23 is used as a mold to form retroreflective articles, the close fitting seams will not substantially reduce the retroreflective fill factor of retroreflective articles made therefrom. In one embodiment, replicas are produced by electroforming. Duplication of the master having a reference edge 13 through electroforming, or otherwise forming a reference edge in a replica tile, may produce tiles that have the precise reference edge 13 needed to create smooth seams 23 in a tiled article.

In one embodiment, replication of the master occurs before any one of a reference edge 13, a rough cut 19, or a face 17 is formed in the master. In one aspect, replication to thereby produce copies of the replica is also performed after one or more reference edges 13 are formed in a replica of the master. Thereafter, a rough cut 19 and face 17 can be formed in the copies and the copies can be mated to form a tiled article. In another embodiment, replication of the master occurs after one or more of a reference edge 13, a rough cut 19, and a face 17 is made in the master or in a tiled article used as a master.

Face

Figure 6:
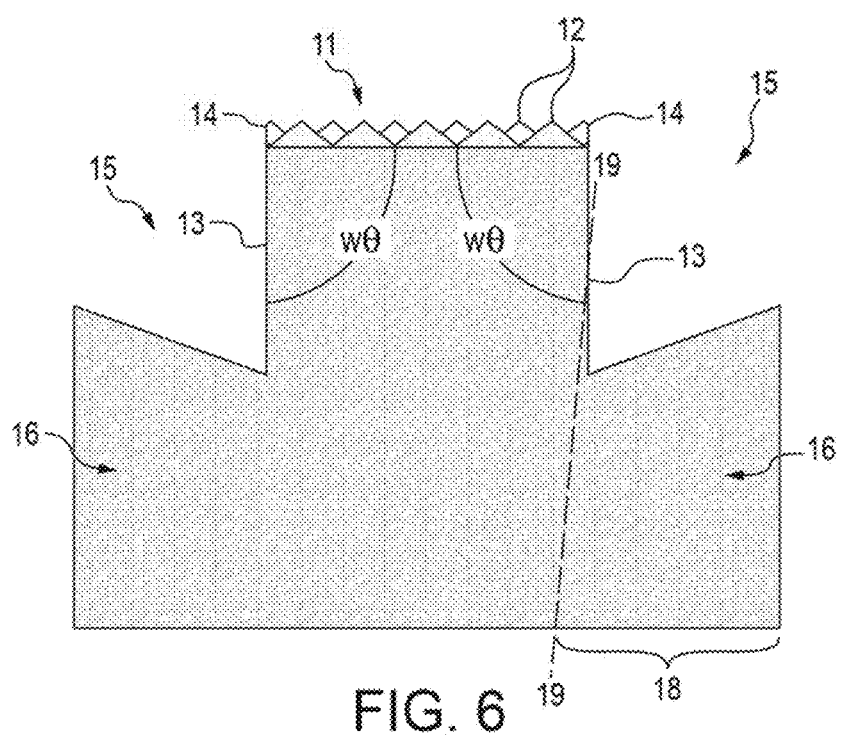
FIG. 6 is a sectional illustration of the substrate, or replica thereof, of FIG. 5 according to the present subject matter, or replica thereof.

In one embodiment in accordance with the present subject matter, the methods include forming a face 17 on tiles that are replicas of the master, or on copies of the replicas. The face formed on the replica tiles or copies thereof, shares a second common edge 20 (see FIG. 7) with the wall. As depicted in FIGS. 6 and 7, the face 17 can be formed by making a rough cut 19 (shown in FIG. 6 in two dimensions as a dotted line) in the tile and removing a portion 18 of the tile, including a portion of the lip 16 on the side of the tile where the face 17 is created. In one embodiment as depicted in FIG. 7, removing the portion 18 of the replica tiles or copies thereof, also results in removing a portion of the wall 13. That is, rough cut 19 is made such that it passes through the wall 13 as shown in FIG. 6. In another embodiment, removing the portion 18 of the tiles does not result in removing a portion of the wall 13. In other words, the rough cut can be made beginning from a bottom edge of the wall 13 (the bottom edge of the wall being the bottom of the depression 15) rather than beginning intermediate between the first common edge 14 and the bottom edge of the wall. In this way, substantially no portion of the wall 13 is removed when forming face 17.

When the face is formed, a portion of the lip 16 on the side of the replica/copies that now contains the face 17 is also removed. Removing the portion 18 of the tiles thereby exposes the wall 13, such that the exposed wall 13 on the tile can be joined wall-to-wall with a similarly exposed wall 13 on another tile, without interference from the lip 16, as shown in FIGS. 8, 9, 12, 16, 17, 22, and 23 for example. That is, the exposed walls 13 on adjacent tiles can be joined so that the exposed walls 13 abut face-to-face at seam 23.

Figure 11:
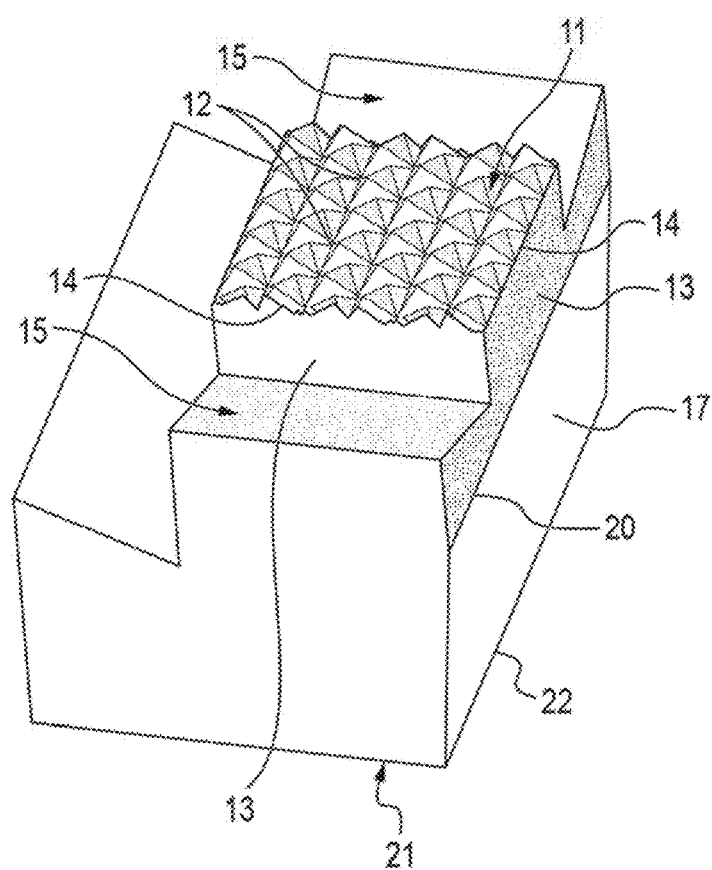
FIG. 11 is a perspective illustration of the substrate, or replica thereof, of FIG. 10, further modified according to the present subject matter.

In one embodiment, an angle between the face 17 and the wall 13 as measured through the tile, herein referred to as the "face angle", is less than about 180° and depicted in FIG. 7 as Fθ. In one aspect, the face 17 extends from the wall 13 to a side of the tile that is opposite the surface 11. This opposite surface is a herein referred to as the "second surface" 21. Referring to FIG. 11, this second surface 21 is shown to share a third common edge 22 with the face 17. In this aspect, the third common edge 22 is on an opposite side of the face 17 from the second common edge 20 as shown in FIG. 11. In this embodiment, as shown in FIG. 8, a first tile 24 has a first face angle Fθ1 that is less than 180°. A second tile 25 has a second face angle Fθ2 that is less than 180°. Thereby, a space 26 is created between faces 17 of the first and second tiles when the first and second tiles are mated as shown.

In another embodiment, the face angle Fθ can be more than 180°. In this embodiment, a mating tile must have a face angle Fθ that when added to the original face angle Fθ, must add up to just less than 360°. This relationship between the two face angles results in providing a space 26 between the faces of two mated tiles.

The face 17 is formed by making a rough cut 19 by laser cutting, water jet cutting, waterjet-guided laser cutting, wire electrical discharge cutting, or the like, in order to remove the portion 18 of the tiles. The rough cut 19 does not have to be made with particular precision, nor is it required that the face 17 be particularly smooth or flat. In this way, rough cut 19 in the tiles can be made by less complex, less time consuming, and less expensive methods than diamond cutting. The characteristics of the rough cut are not critical to forming the precise seams between tiles. In other words, the rough cut 19 is made such that the face 17 is not part of seam 23. In this manner, only the reference edge 13 is used to form the seam 23, wherein tiles are joined by abutting the walls 13 on adjacent tiles face-to-face, thereby forming seam 23. This is depicted in FIGS. 8, 9, 12, 16, 17, 22, 23, and 24, wherein the wall 13 of a first tile 24 is mated with a wall 13 of a second tile 25 to form a seam 23. As depicted, the face 17 formed by making rough cut 19 on each mated tiles does not factor into creating the precision seam 23, and a space 26 is left between the faces 17 of the mated tiles.

As previously discussed, in one embodiment, the face is formed on the master before replication of the master. In another embodiment, the face is formed on the replica tiles. In still another embodiment, the face is formed on copies of the replica.

In another embodiment, a plurality of faces are formed, each corresponding to one of the plurality of walls 13 on the tiles. The plurality of faces are formed, in one embodiment, only after at least two tiles are mated. That is, if more than one face is formed on an individual tile, the second and subsequent faces will not be formed until the individual tile is mated with at least one other tile to form a tiled article. The formation of a plurality of faces results in the removal of the portion 18, comprising lip 16, from the tiles and reduces a lateral dimension of the tiles, measured through a base portion of the tiles. The removal of the lip on the tiles does not affect the ease with which the tiled article is handled, because the tiled article has a larger lateral dimension as compared with the individual tiles.

In one embodiment in accordance with the present subject matter, only one reference edge is exposed on each of the tiles before the tiles are mated. This is shown in different embodiments in FIGS. 7-9, FIGS. 10-12, FIGS. 13-17, and FIGS. 21-24, wherein only one reference edge has been exposed on the individual tiles before mating with another tile. By this method, a lateral dimension in the tile, that is parallel with the exposed reference edge as measured through the base of the tiles, remains constant while mating the two tiles together. In this embodiment, only after two or more tiles have been mated together in this manner—thus producing a tiled article having a larger lateral dimension that the individual tiles and thus being easier to physically handle—are other reference edges on the tiled article created. This process of creating rough cuts 19 and faces 17 on all sides of the tiles allows for the creation of relatively small size prism arrays which are combined to create a tiled article having a plurality of relatively small prism arrays, while only requiring the handling of individual tiles having a relatively large lateral dimension through the base portion. Mating In another embodiment in accordance with the present subject matter, the methods include replicating the master to thereby create at least two tiles, which are joined together to form a tiled article. In another embodiment, a replica is formed from the master, and copies of the replica are formed. The copies are then joined together to form a tiled article. In one embodiment, joining includes positioning the tiles in a desired orientation and includes securing the tiles together. As shown in the figures and specifically in FIGS. 8 and 12 for example, a first tile 24 and a second tile 25, before being joined together, have four walls 13. In other embodiments in accordance with the present subject matter, the tiles can comprise more or less than four reference edges 13. For example as shown in FIGS. 21-24, the tiles have two reference edges or walls 13. It will be understood, that the embodiments depicted in FIGS. 21-24 can have more reference edges formed therein and can include reference edges formed perpendicular to those shown.

A face 17, as previously described, is formed in each of the two tiles. As shown between FIGS. 6 and 7, face 17 can be formed by making rough cut 19. Making the face 17 exposes a wall 13 on each of the tiles 24, 25 for mating with another tile. The exposed walls are situated such that the wall 13 on the first tile 24 is able to abut face-to-face with the wall 13 on the other tile 25.

In one aspect the face 17 is created by making rough cut 19 and removing a portion 18 of the tile. Rough cut 19 can be made using a laser cutter, a water jet cutter, a waterjet-guided laser cutter, a wire electrical discharge cutter, or a combination thereof. In another aspect, a portion of the wall 13 is also removed in creating the face 17. The face 17 is angled as shown in the figures, such that the exposed remaining portion of the wall 13 is able to be placed face-to-face with the wall 13 of another tile. In other words, the walls 13 of the joined tiles sit face-to-face, i.e. one wall facing the other and abutting, in order to form a precision seam 23.

The seam 23 is formed between the walls 13 of the first 24 and second tile 25 as shown in FIG. 8 for example. As shown, a space 26 remains between the first 24 and the second tile 25. This space 26 is defined as the area between opposing faces 17 on the first tile 24 and the second tile 25. That is, the faces 17 on mated tiles do not abut, but are spaced apart. The arrangement of the first and second tiles in this manner produces a substantially continuous array 27 of prism elements 12 that lie substantially in one plane, as shown in FIGS. 8, 9, 12, 16, 17, and 22-24 for example. The array 27 of prism elements comprises the array of prism elements on the surface 11 of the first tile 24 and the array of prism elements on the surface 11 of the second tile 25.

Figure 9:
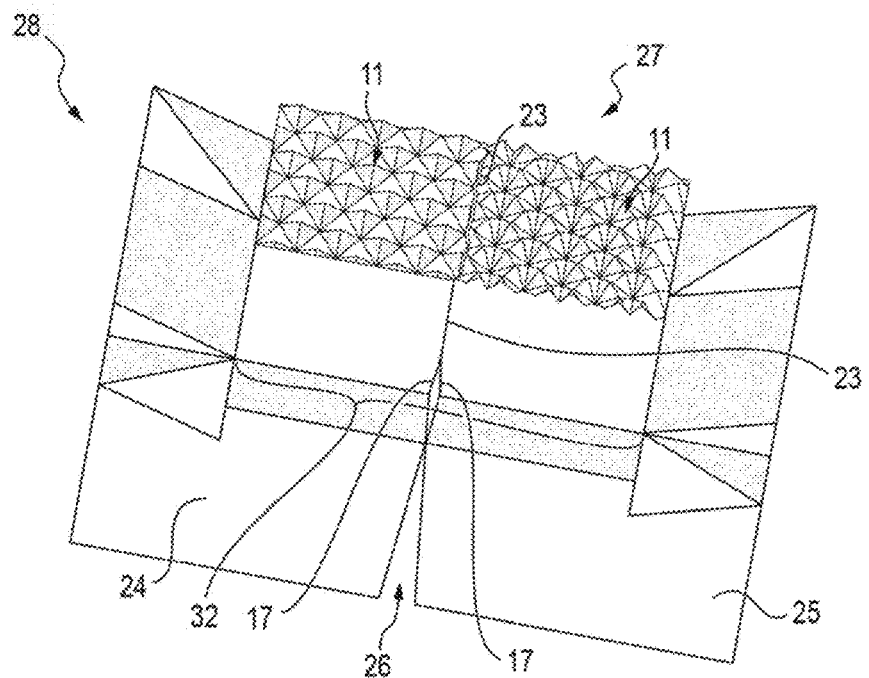
FIG. 9 is a perspective illustration of the tiled article of FIG. 8 according to the present subject matter.
Figure 12:
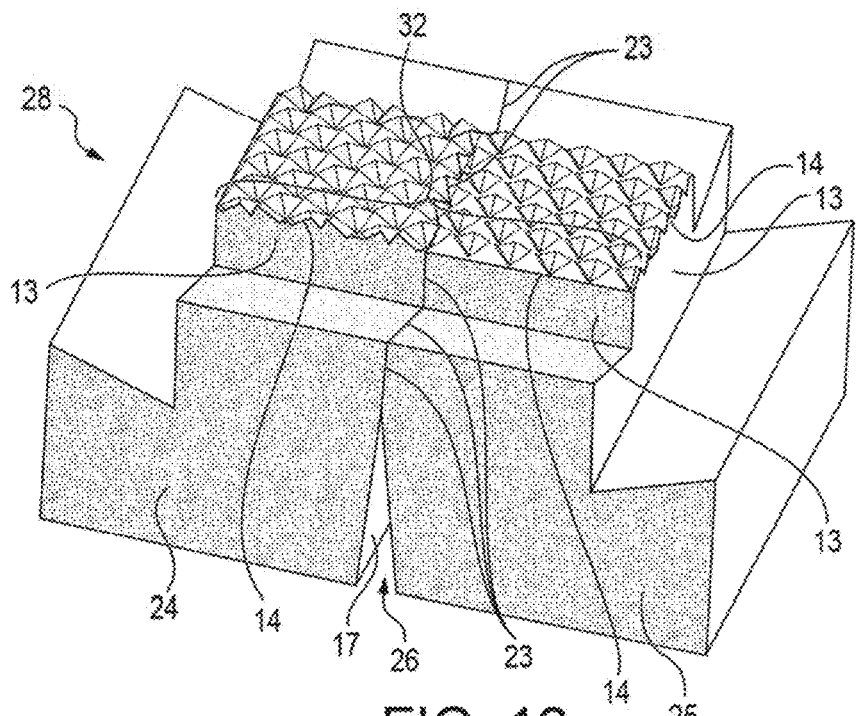
FIG. 12 is a perspective illustration of a tiled article including the substrate, or replica thereof, of FIG. 11, according to the present subject matter.
Figure 13:
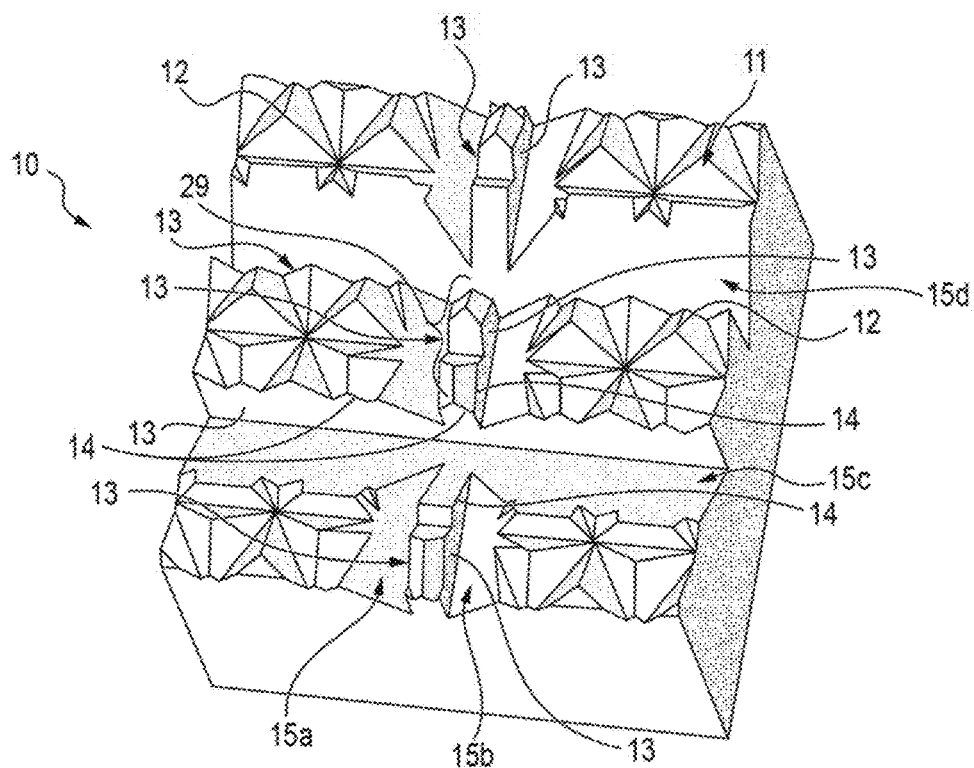
FIG. 13 is a perspective illustration of a substrate according to the present subject matter.

As shown in FIGS. 8, 9 and 12, the prism elements on the first tile 24 and the prism elements on the second tile 25 have different prism orientations that are offset between the first tile 24 and the second tile 25 by about 90°. In other embodiments in accordance with the present subject matter, the prism orientation of the prism elements 12 on the first and second tiles of the tiled article 28 can differ from about 15 degrees to about 180 degrees. When scaling up the tiled article to include more tiles, the prism orientation between individual adjacent tiles can be tailored so as to be in an alternating pattern, a sequence pattern, a random arrangement, or a combination thereof.

The first tile 24 and the second tile 25 can be secured together in any number of ways in order to form the tiled article 28. In one embodiment, the first tile and the second tile are secured together at the seam 23 by laser welding the tiles from the side of the tiled article 28 opposite the array 27 of prism elements. In this way, a laser beam is directed into the space 26 thereby forming a weld in the space 26 between the two tiles.

As shown in FIGS. 9 and 12, three walls 13 on each of the first tile 24 and the second tile 25 are not in a face-to-face orientation with a corresponding wall on the other substrate. Two of these non face-to-face walls on one side of each of the tiles, nonetheless abut and have shared edges at seam 23, as shown. These two non face-to-face walls 13 of the first tile 24 and the second tile 25 are nevertheless flush and lie in substantially the same plane as shown. In other words, the walls meeting at the seam 23, yet not abutting face-to-face, form a substantially continuous larger wall 32 on the tiled article 28. This substantially continuous larger wall 32 may be used as a larger reference edge 32 for the tiled article for mating with a larger reference edge 32 of another tiled article. Two larger reference edges 32 may be mated by forming a face in the tiled article 28 corresponding to the larger reference edge 32, thus exposing the larger reference edge 32 of the tiled article for mating with a larger reference edge 32 of another tiled article. This produces a larger tiled article comprising four individual tiles. This process can be used to scale up the tiled article to include more and more individual tiles, as described below.

Figure 17:
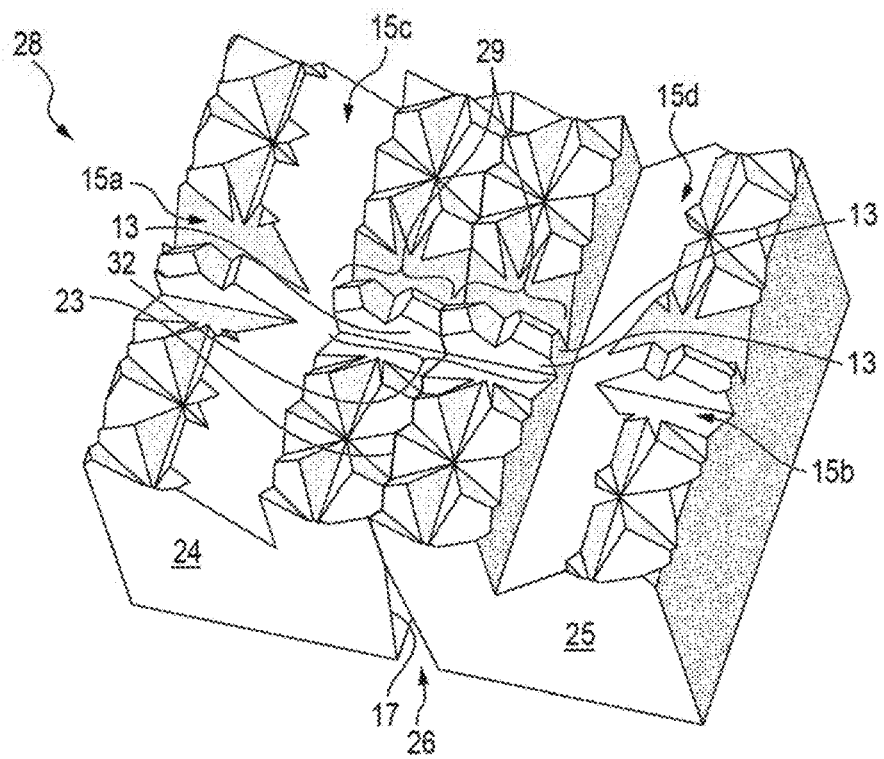
FIG. 17 is a perspective illustration of the tiled article of FIG. 16 according to the present subject matter.
Figure 23:
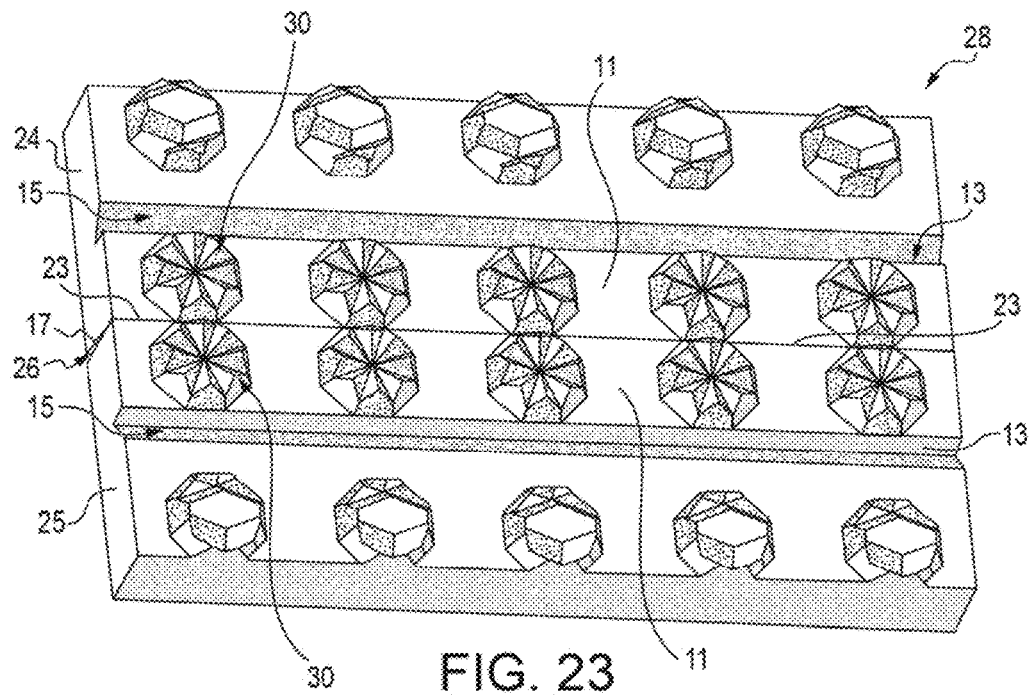
FIG. 23 is a perspective illustration of the tiled article of FIG. 22 according to the present subject matter.
Figure 24:
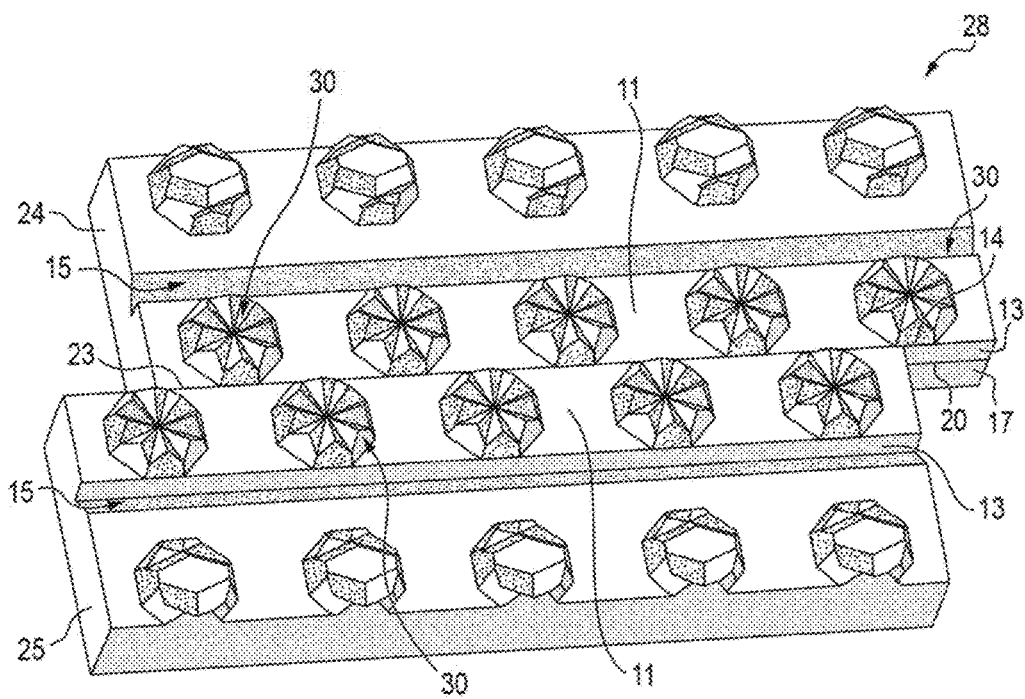
FIG. 24 is another perspective illustration of the tiled article of FIG. 22 according to the present subject matter.

In accordance with the present subject matter, the tiled article 28 as shown in FIGS. 8, 9, 12, 22, 23, and 24 can itself be used as a master in creating replicas of the tiled article. In this way, the tiled article 28 comprising the first tile 24 and the second tile 25, can be replicated by electroforming. For example, the tiled article 28 shown in FIGS. 8-9 can be duplicated by electroforming and may produce a unitary, single-piece tile that is identical to that shown in FIGS. 8-9, but without seam 23. After replicating the tiled article 28, the replicas of the tiled article each have four reference edges. In FIGS. 9, 12, and 17, these four reference edges comprise the larger reference edge 32 and the three other reference edges that surrounding the array of prism elements 27. In FIG. 17, these four reference edges comprise the larger reference edge 32 and the three other reference edges surrounding the two pairs of rectangular cube corner prism elements 29. In another embodiment as shown in FIGS. 22-24 the tiled article themselves each have two reference edges 13, as shown. As can be seen in FIGS. 9, 12, and 17, replicas of the tiled article can be joined together by making one or more faces to expose the larger reference edge 32, or to expose one of the other reference edges on the replicas, so that the replica can be joined to a reference edge of a different tile or different replica of the tiled article, in order to form larger tiled articles. In this embodiment a face is formed on the replicas of the tiled article by removing a portion (e.g. the lip 16) of the replicas of the tiled article in a way similar to that previously described for the individual tiles. In this way an angled face, similar to that formed by rough cut 19 on the replica tiles shown in FIG. 6, can be made on the replicas of the tiled article depicted in FIGS. 9, 12, and 17. The formation of the face on the replicas of the tiled article removes a portion (e.g. the lip) of the replicas of the tiled article, thus exposing one of the four reference edges on the replicas of the tiled article. Similar cuts are made on other tiles or replicas of the tiled article, similarly exposing one of the four reference edges on the other tiles or replicas of the tiled article, so that exposed reference edges can be mated face-to-face to form larger seams and larger tiled articles.

These exposed reference edges 13 on the replicas of the tiled article are brought together in a similar manner as previously disclosed for the first tile 24 and the second tile 25 in forming the tiled article 28 in FIG. 9. The replicas of the tiled article can be brought together to form a seam between replicas of the tiled article, wherein the seam between the replicas of the tiled article may be parallel to, and/or perpendicular to, the original seam 23 formed on the tiled article 28. This replication process, wherein seams are formed parallel to, and/or perpendicular to, the seam 23 on the tiled article 28 in FIG. 9, produces rows and/or columns of tiles in a larger tiled article. Further replication can be made of the larger tiled articles. Optionally rows and/or columns of tiled articles can be connected together wherein seams are formed perpendicular to, and/or parallel to, the original seam 23 in the tiled article 28 in FIG. 9. The process of forming seams perpendicular and parallel to seam 23 in the tiled article 28 in FIG. 9, results in individual tiles joined together to form a large tiled article having a larger arrays of prism elements thereon. In one embodiment, the large tiled article has varied prism orientation between adjacent tiles. These larger tiled articles are used as molds for forming a retroreflective article.

The present subject matter is not limited to a particular order of i) replication ii) formation of wall 13, iii) formation of face 17, and iv) joining as described. Rather the present subject matter encompasses replication, wall formation, face formation, and joining operations that can be performed as needed to ensure good alignment and seam formation between individual tiles on a tiled article. The replication, wall formation, face formation, and joining steps can be repeated as required to scale up the tool to a size desired in order to form a mold used to make retroreflective articles.

In one embodiment of the present subject matter, the methods further include forming new reference edges on tiles, tiled articles, or replicas thereof, so as to ensure a smooth, flat reference edge on the tiled article for properly forming a precise seam with another tiled article. In other words, after two or more tiles are joined together to form a tiled article, a new reference edge can be created in the tiled article. This process ensures that the tiled article, which may be replicated thereafter, has a reference edge that is sufficiently straight and flat in order to form a straight and smooth seam with another tiled article or a replica.

Isolating Prism Elements and Clusters

As previously described, methods in accordance with the present subject matter can be used to isolate and tile individual prism elements or prism clusters. It will also be appreciated that the current methods can be used for isolating and tiling almost any number of prism elements or prism clusters.

In one embodiment as depicted in FIGS. 13-25, a substrate 10 is provided having prism elements 12 formed thereon. In one aspect, shown in FIGS. 13-17, walls 13 are formed in the substrate so as to isolate a single prism element using diamond cutting techniques. As shown, a substrate 10 has four depressions 15a-15d formed therein. Depression 15a is adjacent to both depressions 15c and 15d. Depression 15b is adjacent to both depressions 15c and 15d. Depression 15c is adjacent to both depressions 15a and 15b. Depression 15d is adjacent to both depressions 15a and 15b. As shown, adjacent depressions extend into the substrate at different heights, wherein depressions 15c and 15d extend into the substrate at a greater height than do depressions 15a and 15b. The reference edges 13 formed by making the depressions 15a-15d, are shown in FIG. 13 to isolate and define a boundary for an opposed pair of rectangular cube corner prism elements 29. It will be understood that the present methods are not limited to isolating an opposed pair of rectangular cube corner prism elements 29, but can be utilized to isolate other types of prism elements or clusters. The walls 13 are shown to be at about 90° to the surface 11 of the substrate 10. The substrate depicted in FIG. 13 may be a master used to form replica tiles, or may be a replica of the master that is used to form copies.

Figure 14:
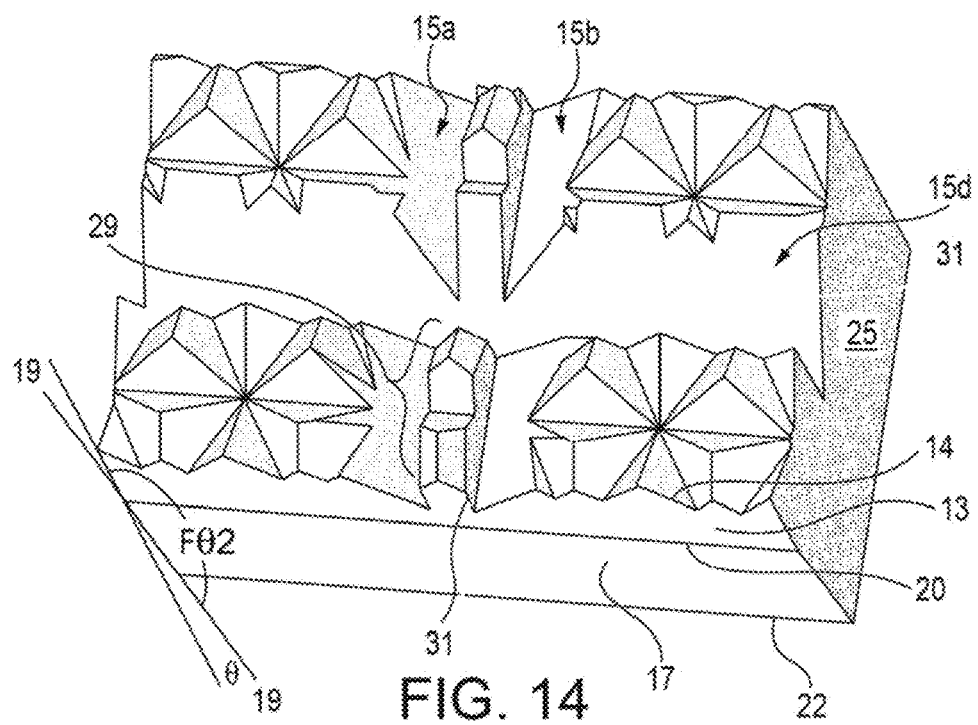
FIG. 14 is a perspective illustration of the substrate, or replica thereof, of FIG. 13, further modified according to the present subject matter.
Figure 15:
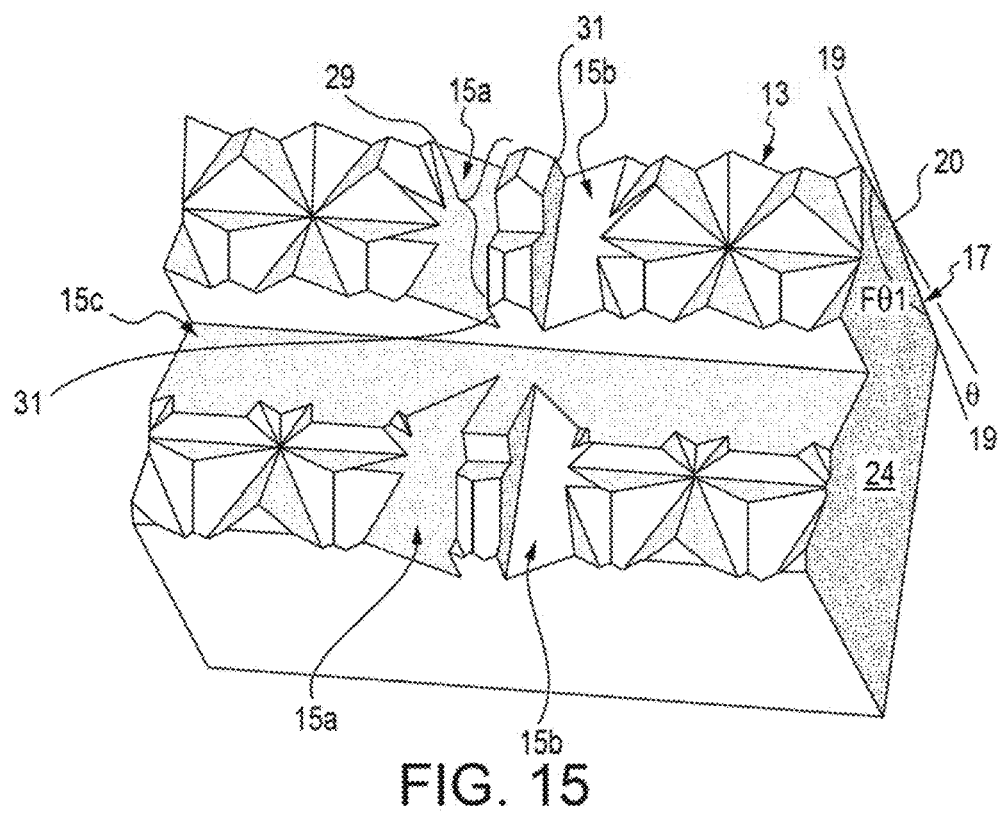
FIG. 15 is a perspective illustration of the substrate, or replica thereof, of FIG. 13, further modified according to the present subject matter.

Portions of the tiles are removed by making rough cut 19 at an angle θ as shown in FIGS. 12, 13 and 14 in order to form face 17. The angle θ is measured between rough cut 19 and the plane of reference edge 13. The angle θ is supplementary to the face angle. The portions removed from the tiles can be removed using laser cutting, water jet cutting, waterjet-guided laser cutting, wire electrical discharge cutting, or other techniques.

Figure 16:
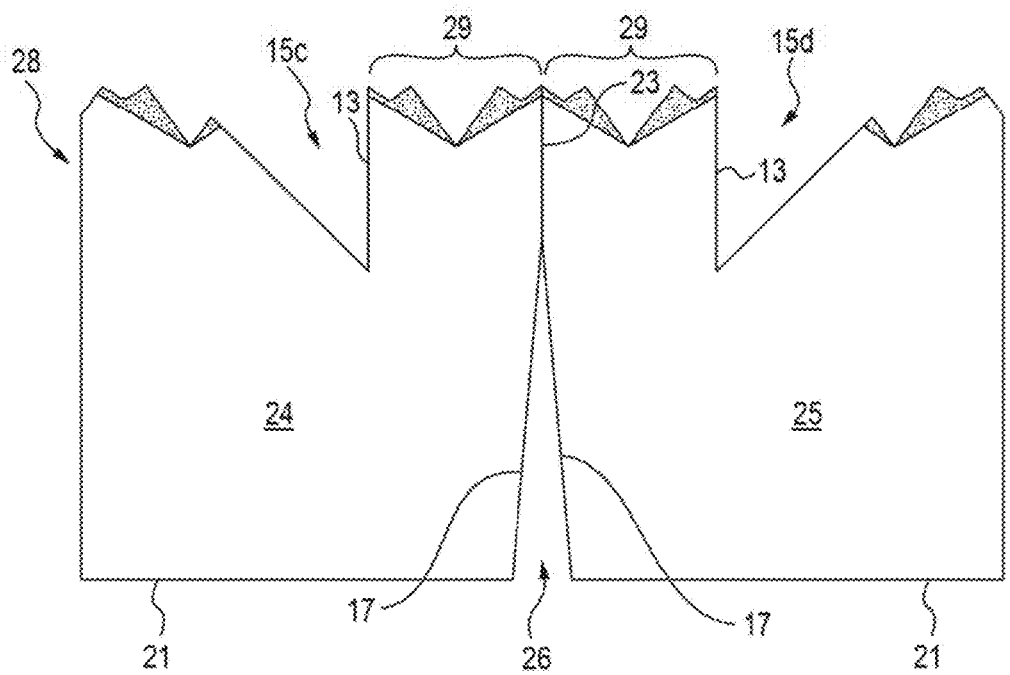
FIG. 16 is a sectional illustration of a tiled article according to the present subject matter, including the substrate of FIG. 14 and the substrate of FIG. 15.

Two tiles 24, 25, thus modified, are joined to form a tiled article 28 having two pairs of rectangular cube corner prism elements 29 mated together at a seam 23 as shown in FIGS. 16 and 17. In this method, the first tile 24 has a portion removed to expose a reference edge 13. The second tile 25 has an opposite portion of the tile removed to expose a reference edge 13 on the second tile 25. The two reference edges are brought together so that the two reference edges 13 on the first and the second tiles are face-to-face as shown in FIGS. 16 and 17.

As previously described, a space 26 remains between the first tile 24 and the second tile 25 on the tiled article 28, wherein faces 17 do not abut. This space 26 is used for laser welding or for other techniques to secure the first tile 24 and the second tile 25 together. The resulting tiled article 28 has two pairs of rectangular cube corner prism elements 29 that collectively form an array of prism elements on the tiled article 28. This array comprises the two pairs of rectangular cube corner prism elements 29 in a single plane. This tiled article can be further replicated and modified by forming faces corresponding to the walls 13 that have not been mated. After further replication and modification, the tiled article, or replicas thereof, can be mated with similarly modified tiles to form an even larger tiled article. The present subject matter is not limited to isolating a pair of rectangular cube corner elements as depicted, but can be used to isolate a single rectangular cube corner prism element or any number of prism elements or clusters as desired.

In another embodiment in accordance with the present subject matter, the methods include forming or isolating prism element clusters on a substrate. The substrate may thereafter be used as a master for making replicas, or may be a replica used for making copies. The replicas or copies may then be joined to form an array of prism clusters. In one aspect of this embodiment, triangular quartet or octet prism clusters are formed in a surface 11 of a substrate 10 as shown between FIGS. 18 to 20. Other types of prism clusters are contemplated to be within the present subject matter. In this embodiment, the methods can be used to reduce spacing between prism clusters. It will be understood that the spacing between prism clusters as shown in the figures, can be minimized by forming reference edges and faces on the surface 11 of the substrate, replicas, or copies that are perpendicular to the edges and faces depicted in the figures and by forming seams perpendicular to the seam 23 shown.

Figure 18:
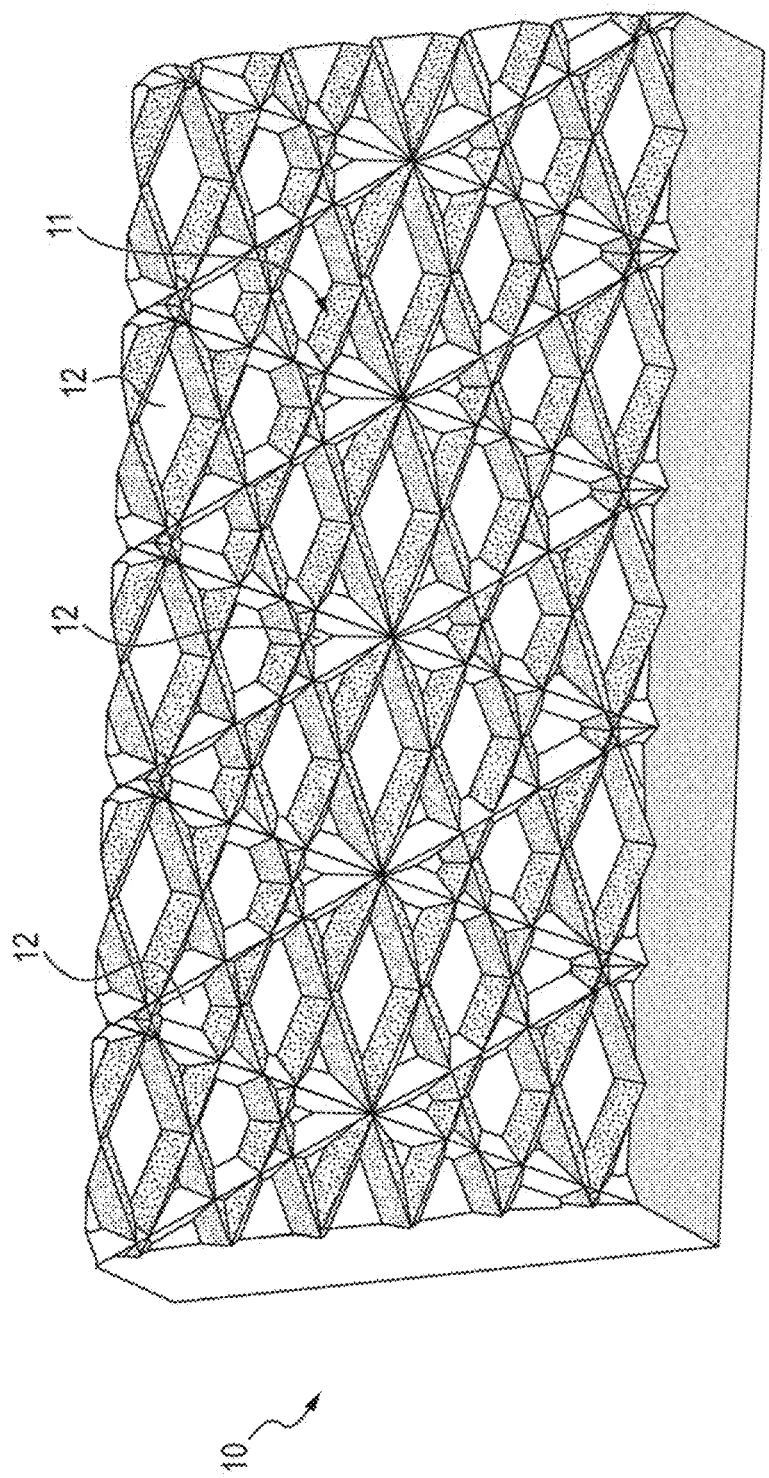
FIG. 18 is a perspective illustration of a substrate according to the present subject matter.
Figure 19:
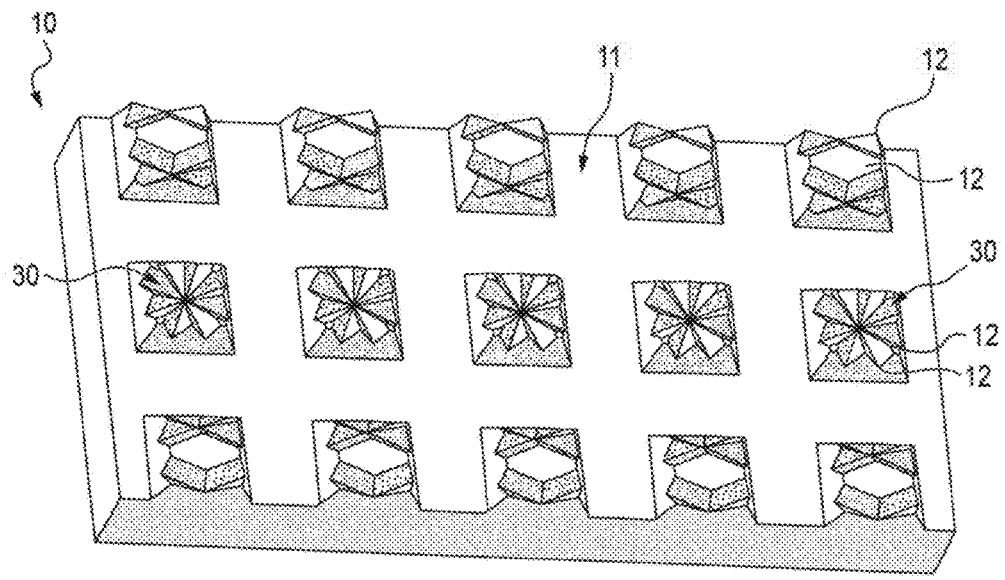
FIG. 19 is a perspective illustration of the substrate of FIG. 18, further modified according to the present subject matter.
Figure 20:
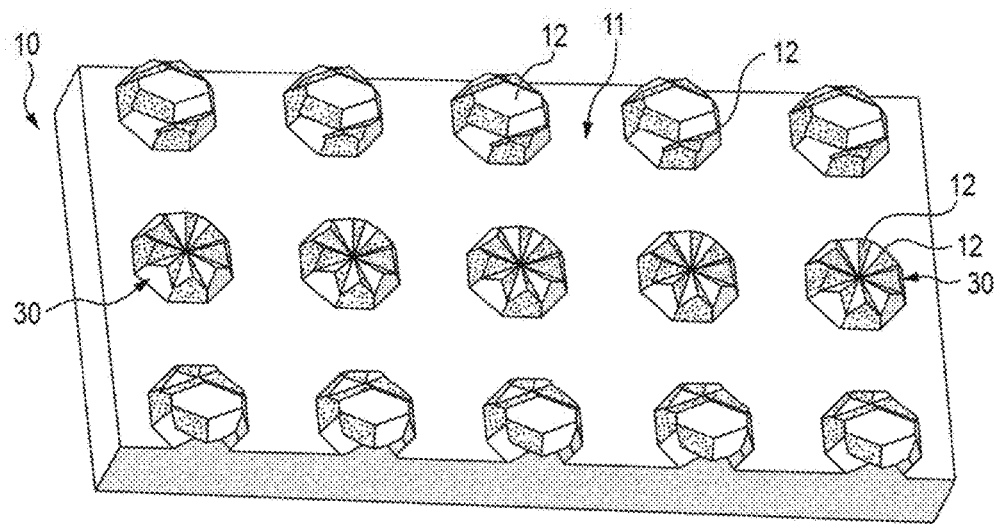
FIG. 20 is a perspective illustration of the substrate of FIG. 19, further modified according to the present subject matter.

In accordance with the present subject matter, a substrate 10 is provided having prism elements 12 on a surface 11, as shown in FIG. 18. Portions of the prism elements 12 are removed from the substrate in order to isolate square prism clusters 30 as shown in FIG. 19. The prism clusters are then modified to make octet prism clusters as shown in FIG. 20 wherein corners of the square prism clusters are removed. In one aspect, removing portions of the prism elements to isolate/form the prism clusters can be accomplished by diamond cutting. Other removal techniques can be used. In one aspect, walls 13 can simultaneously be formed in the substrate as an integral part of isolating prism clusters 30. That is, the formation of the walls 13 can result in isolating the prism clusters 30.

In another aspect, walls 13 are formed separate and apart from the isolation of the prism clusters 30. This aspect is depicted in the figures, wherein the prism clusters 30 are shown to be isolated in FIGS. 19-20, separate and apart from formation of the walls 13 in FIG. 21.

In one embodiment as depicted in FIG. 21, depressions 15 are formed on opposite sides of one or more prism clusters 30 or rows or columns of prism clusters. The depressions 15 are at least partially defined by the reference edges 13. The depressions 15 and reference edges 13 are formed as previously described herein. As shown in FIG. 21, the reference edges 13 share a first common edge 14 with both the prism clusters 30 and with the surface 11 of the substrate.

In the present methods, a substrate 10 is produced having prism element clusters 30 on the surface 11 thereof. This substrate may then be used as a master for forming replica tiles, or may be a replica of the master used for forming copies. The prism clusters 30 can be the same or different. Replication can take place before or after formation of walls 13. If replication takes place before the formation of walls, the walls are then formed in replica tiles. Replication of the replicas may thereby produce copies including the walls. If replication takes place after the formation of walls, the replica tiles will already include walls.

The tiles are modified by making a face 17 as previously described and as shown in FIG. 22, in order to expose the wall 13 for use in mating with another tile. The reference edges 13 on each of the tiles are abutted face-to-face along a seam 23 as shown in FIGS. 22-24. The tiles can be mated such that prism clusters 29 are aligned as shown in FIG. 23, or mated such that prism clusters are off-set as shown in FIG. 24.

Masters, Tiled Articles, and Molds

In various embodiments, the present subject matter provides masters, tiled articles, and molds used in making retroreflective articles.

In one embodiment, the present subject matter provides a substrate that is used in a process for making retroreflective articles. The substrate includes a surface comprising an array of prism elements thereon. The substrate includes one or more depressions, wherein each of the one or more depression is at least partially defined by a reference edge. The substrate includes a base portion comprising a lip, the lip defining a periphery of the base portion.

The present subject matter also provides a tiled article comprising tiles positioned together in a two dimensional pattern. Each tile comprises a top surface including an array of prism elements, and side surfaces. The tiles comprise edge tiles and optionally interior tiles. Each side surface of each interior tile includes a wall and a face. At least one side surface of each edge tile includes a wall and a face. Each wall of each interior tile is abutting face-to-face with a wall of an adjacent tile and each face on each interior tile does not abut face-to-face with a face of an adjacent tile. Each wall of each edge tile is abutting face-to-face with a wall of an adjacent tile and each face on each edge tile does not abut face-to-face with a face of an adjacent tile In accordance with the present subject matter, both the master and the tiled article, or replicas of either, or copies of the replicas, can be used as molds for making retroreflective sheeting or can be used to create further replica tiles, which can be mated to form larger tiled articles.

Methods

The present subject matter also provides various methods associated with making masters, tiled articles, molds, and retroreflective articles.

In one embodiment, the present subject matter provides a method of making an article, the article being a master, a replica, a copy of the replica, or a tile as previously described herein. The master is used to make replica tiles, which may optionally be copied, wherein the replica tiles or copies thereof may be joined to form a mold for making retroreflective articles. The method includes forming prism elements on a surface of a substrate, forming a wall on the substrate, and forming a face on the substrate. The wall shares a first common edge with the surface and shares a second common edge with the face. The first common edge is on an opposite side of the wall from the second common edge.

The present subject matter also provides a method of making a tiled article. The tiled article is used as a mold for making retroreflective articles. The method includes providing a tile including a top surface comprising prism elements. The method also includes forming a wall on the tile by removing a portion of the top surface of the tile, wherein the wall shares a first common edge with the top surface of the tile. The method further includes forming replicas of the tile and positioning the replicas such that the wall on each replica is face-to-face with, and directly abuts a wall on an adjacent replica to thereby form a tiled article.

The present subject matter provides another method of making a tiled article. The method includes forming prism elements on a surface of a substrate. The method includes forming a reference edge on the substrate, such that the reference edge extends into the substrate at about 90° to the surface having the prism elements. The method further includes forming replicas of the substrate and removing a portion of each replica such that a reference edge on each replica is able to abut face-to-face with a reference edge on a different replica. The method also includes abutting face-to-face the reference edge on each replica to a reference edge on another replicas. The method includes securing the replicas together to thereby form a tiled article.

The present subject matter provides another method of making a tiled article. The method includes providing a substrate having prism elements in a surface thereof. The method also includes creating replicas of the substrate, each replica having at least one reference edge therein. The method also includes creating at least one reference edge in each replica. The method also includes creating a rough cut through each reference edge in each replica, and tiling the replicas such that reference edges in the replicas abut face-to-face and rough cuts in the replicas do not abut face-to-face, to thereby produce the tiled article. The substrate can be a master or a tile formed by replicating the master.

The present subject matter provides a method of making a retroreflective article. The method includes providing a master as previously described herein. The method includes forming prism elements on a surface of a master and creating a replica of the master. The method includes creating at least one reference edge on the replica. The method includes creating copies of the replica. The method further includes positioning the copies relative to each other such that reference edges on each copy abut face-to-face. The method also includes optionally repeating creating at least one reference edge on the master, creating replicas of the master, or positioning the replicas relative to each other such that reference edges on each replica abut face-to-face. During repeating of these operations, the operations are performed either on the tiled article or on the master. The method also includes molding a retroreflective article from a mold produced by these operations.

The present subject matter provides another method of making an article. The method includes forming an array of prism elements on a surface of a substrate; and forming a plurality of walls on the substrate to thereby form the article; wherein each of the plurality of walls shares a first common edge with the surface.

The present subject matter provides another method of making a mold used for forming retroreflective articles. The method includes providing a plurality of tiles, each tile having prism elements on a surface thereof, one or more reference edges, and a lip. The method also includes making one or more rough cuts in each of a plurality of tiles to thereby remove the lip on each of the plurality of tiles and to thereby expose one or more reference edges on each of the plurality of tiles. The rough cut is made such that each of the one or more exposed reference edges on each of the plurality of tiles is able to abut face-to-face exposed reference edges on other tiles of the plurality of tiles and rough cuts on each of the plurality of tiles do not abut rough cuts on other tiles of the plurality of tiles. The method includes mating the plurality of tiles such that the one or more exposed reference edges on each of the plurality of tiles abut face-to-face. The method also includes securing the plurality of tiles (and possibly replicating this assembly) to thereby make the mold. The tiles can be formed by replicating a master, wherein the master optionally includes a reference edge before replication. In the event that the master does include a reference edge, replication of the master produces tiles also having the reference edge. In the event that the master does not include a reference edge, the reference edge can be formed in the tiles after replication.

Those skilled in the art will recognize that the above variations of the inventive method allowing for control of incidence angularity, entrance angularity, and observation angularity, are not necessarily mutually exclusive, and can be combined by one skilled in the art to produce an array having a desired combination of retroreflector performance characteristics.

All patents, published applications, and articles noted herein are hereby incorporated by reference in their entirety.

All of the features disclosed in the specification, including the claims, abstract, and drawings, and all of the operations in any method or process disclosed, may be combined in any combination, except combinations where at least some of such features and/or operations are mutually exclusive. Each feature disclosed in the specification, including the claims, abstract, and drawings, can be replaced by alternative features serving the same, equivalent, or similar purpose, unless expressly stated otherwise. Thus, unless expressly stated otherwise, each feature disclosed is one example only of a generic series of equivalent or similar features. Publications, patents and patent applications are referred to throughout this disclosure. All references cited herein are hereby incorporated by reference.

The foregoing detailed description of the present subject matter is provided for purposes of illustration, and it is not intended to be exhaustive or to limit the subject matter to the particular embodiments disclosed. The embodiments may provide different capabilities and benefits, depending on the configuration used to implement the key features of the subject matter. Accordingly, the scope of the subject matter is defined only by the following claims.

What is claimed is:

1. A method of making an article, the method comprising:
    forming prism elements on a first surface of a substrate;
    forming a wall on the substrate, wherein the wall shares a first common edge with the first surface; and
    forming a face on the substrate, wherein the wall shares a second common edge with the face, wherein the face shares a third common edge with a second surface of the substrate, and wherein the second surface is on an opposite side of the substrate from the first surface;
    wherein the first common edge is on an opposite side of the wall from the second common edge, and wherein the third common edge is on an opposite side of the face from the second common edge.

2. The method according to claim 1, wherein an angle between the wall and the first surface is about 90° as measured through the substrate.

3. The method according to claim 1, wherein a height of the wall is greater than a height of the prism elements.

4. The method according to claim 1, wherein the wall is formed by making a depression in the substrate, the depression being at least partially defined by the wall.

5. The method according to claim 4, wherein making the depression includes removing a portion of the prism elements.

6. The method according to claim 1, wherein the wall is formed by diamond cutting.

7. The method according to claim 1, wherein:
    forming the wall comprises forming a plurality of walls; and
    the prism elements are bounded by the plurality of walls.

8. The method according to claim 7, wherein:
    each of the plurality of walls shares a common interface with adjacent walls of the plurality of walls; and
    depressions forming adjacent walls have different heights.

9. The method according to claim 1, wherein forming the wall on the substrate does not reduce a lateral dimension of the substrate.

10. The method according to claim 1, wherein the face is formed by removing a portion of the substrate.

11. The method according to claim 10, wherein removing a portion of the substrate includes removing a portion of the wall.

12. The method according to claim 1, wherein an angle between the face and the wall is less than 180° as measured through the substrate.

* * * * *